United States Patent Office 3,538,085
Patented Nov. 3, 1970

3,538,085
1-PHENYLSULFONYL-2-IMINO-IMIDAZOLIDINES
AND HEXAHYDROPYRIMIDINES
Henri Dietrich, Arlesheim, Switzerland, assignor to Geigy
Chemical Corporation, Ardsley, N.Y., a corporation
of New York
No Drawing. Continuation-in-part of application Ser. No.
624,195, Mar. 20, 1967. This application Oct. 23, 1968,
Ser. No. 770,102
Claims priority, application Switzerland, Mar. 24, 1966,
4,280/66; Mar. 14, 1968, 3,881/68, 3,882/68
Int. Cl. A61k 27/00; C07d 49/34, 51/42
U.S. Cl. 260—239.9                          15 Claims

ABSTRACT OF THE DISCLOSURE 1-phenylsulfonyl - 2-imino - imidazolidines and -hexahydropyrimidines, substituted at the heterocyclic ring and substituted or unsubstituted at the phenyl ring are prepared; these compounds and their pharmaceutically acceptable acid addition salts have hypoglycemic activity; pharmaceutical compositions comprising said compounds and methods of producing hypoglycemic effects in mammals are provided; an illustrative embodiment is 1-sulfanilyl-2-imino-3-butyl-imidazolidine.

CROSS REFERENCE TO RELATED APPLICATIONS

This is a continuation-in-part application of copending patent application Ser. No. 624,195, filed Mar. 20, 1967, now abandoned.

DETAILED DISCLOSURE

This invention relates to hypoglycemically active 1-phenylsulfonyl - 2-imino-imidazolidines and 1-phenylsulfonyl-2-iminohexahydropyrimidines pharmaceutically acceptable acid addition salts thereof, their production, pharmaceutical compositions containing them and a method of producing a hypoglycemic effect comprising administration of such compounds.

More particular the invention relates to phenylsulfonamide derivatives of the Formula I

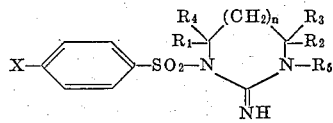

wherein
$n$ is 0 (zero) or 1;
each of $R_1$ and $R_2$, independently of the other, is hydrogen or lower alkyl;
each of $R_3$ and $R_4$, independently of the other, is hydrogen lower alkyl, or, if $n$ is 0, form together the tetramethylene radical;
$R_5$ is alkyl, alkoxyalkyl, alkylthioalkyl, alkenyl, cycloalkyl, cycloalkenyl, or aralky; and
X is hydrogen, fluoro, choro, bromo, lower alkyl, lower alkoxy, lower alkylthio, acetyl or amino;

and pharmaceutically acceptable acid addition salts thereof, which compounds on oral or parenteral administration have strong hypoglycemic activity. This fact is surprising, because it is known in the art that sulfanilylguanidines and N-alkyl derivatives thereof of the formula

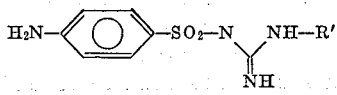

wherein R' is hydrogen or alkyl, and N-(1-imidazolin-2-yl)-p-chlorophenylsulfonamide of the formula

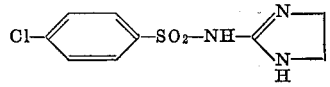

have no hypoglycemic activity.

The hypoglycemic activity of the compounds of the invention is furthermore surprising, because p-substituted 1-phenylsulfonyl-2-imidazolidinones, e.g. of the formula

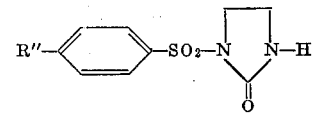

have hyperglycemic activity, i.e. they increase the blood sugar level in mammanls.

Moreover, in contrast to sulfanilylguanidines and N-sulfanilyl-N'-alkyl ureas, the compounds according to the invention are free from antibacterial activity.

These beneficial properties in combination with a favourable therapeutic index render the compounds of the invention well suited for the treatment of diabetes.

In the compounds of Formula I, $R_1$, $R_2$, $R_3$, $R_4$, $R_5$ and X as lower alkyl groups can be an alkyl group of from 1 to 4 carbon atoms, e.g. the methyl, ethyl, propyl, iso-propyl, butyl, i-butyl, sec. butyl or tert. butyl group. Furthermore $R_5$ can be, e.g. the following groups; as alkyl group an alkyl group of from 5 to 12 carbon atoms, e.g. the pentyl, i-pentyl, 2,2-dimethylpropyl, 1-methylbutyl, 1 - ethylpropyl, 1,2 - dimethylpropyl, hexyl, heptyl, octyl, nonyl, decyl or dodecyl group; as alkenyl group an alkenyl group of from 3 to 4 carbon atoms, e.g. the allyl, 1 - methylallyl, 2 - methylallyl or the 2 - butenyl group; as alkoxyalkyl or alkylthioakyl an alkyl group of from 3 to 8 carbon atoms which is interrupted by an oxygen ether or a thioether bond, e.g. the 2-methoxyethyl, 3-methoxypropyl, 4 - methoxybutyl, 2 - ethoxyethyl, 3 - ethoxypropyl, 4 - ethoxybutyl, 2 - propoxyethyl, 3 - propoxypropyl, 4 - propoxybutyl, 2 - i - propoxyethyl, 3-i-propoxyethyl, 4 - i - propoxybutyl, 2 - butoxyethyl, 3-butoxypropyl or the 4-butoxybutyl group as well as the corresponding thioether; as cycloalkyl group a saturated cyclic hydrocarbon group of from 3 to 10 carbon atoms, which can be substituted with a methyl or an ethyl group, e.g. the cyclopropyl, methylcyclopropyl, cyclobutyl, methylcyclobutyl, cyclopentyl, methylcyclopentyl, cyclohexyl, methylcyclohexyl, ethylcyclohexyl, cycloheptyl, methylcycloheptyl, cyclooctyl, methylcyclooctyl, cyclononyl, cyclodecyl, adamantyl or the norbornyl group; as cycloalkenyl group an unsaturated cyclic hydrocarbon group of from 5 to 9 carbon atoms with one double bond, e.g. the 2 - cyclopenten - 1 - yl, 2-cyclohexen-1-yl, 3-cyclohexen-1 - yl, 2 - methyl - 2-cyclohexen-1-yl, 3-methyl-2-cyclohexen - 1 - yl, 3 - methyl-5-i-propyl-2-cyclohexen-1-yl or the 4 - cycloocten - 1 - yl group, and as aralkyl group preferably a phenylalkyl group, e.g. the benzyl or the phenethyl group.

A preferred class of compounds of particular strong hypoglycemic activity and freedom from antibacterial activity are compounds of Formula Ia

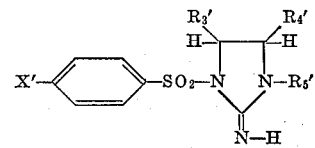

(Ia)

wherein each of $R'_3$ and $R'_4$, independently of the other, is hydrogen or lower alkyl, $R'_5$ is alkyl and cycloalkyl having at most 5 carbon atoms, and X' is amino, chloro, methoxy and acetyl, and the pharmaceutically acceptable acid addition salts thereof.

According to a first process the compounds of Formula I are produced by reacting, optionally in the presence of an acid binding agent, a reactive functional derivative of a sulfonic acid of the formula

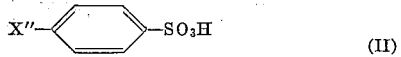
(II)

wherein X" has the meaning as defined for X under Formula I, except amino, and has the meaning of a masked amino group convertible into an amino group by hydrolysis, reduction or reductive cleavage, with a compound of the formula

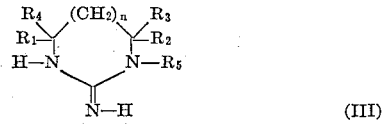
(III)

respectively its tautomeric form of the formula

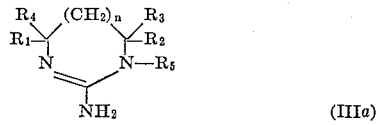
(IIIa)

wherein $n$, $R_1$, $R_2$, $R_3$, $R_4$ and $R_5$ have the meanings given in Formula I, where applicable hydrolysing or reducing the reaction product obtained to convert the group X" into the free amino group and, if desired, converting the compound obtained into an acid addition salt.

As reactive functional derivatives of Formula II are suitable the halides, particularly the chlorides, and the anhydrides of the formula

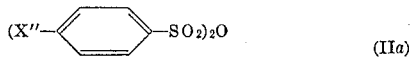
(IIa)

The reaction is preferably performed in the presence of a water miscible or water non-miscible inert organic solvent in the presence or absence of water. Suitable inert organic solvents are, e.g., hydrocarbons such as benzene, toluene or xylene, ether-type solvents such as diethyl ether, dioxane or tetrahydrofuran, chlorinated hydrocarbons such as methylene chloride, and lower ketones such as acetone or methyl ethyl ketone. Inorganic bases or salts can be used as acid binding agents, e.g., an alkali hydroxide, acetate, hydrogen carbonate, carbonate and phosphate such as sodium hydroxide, sodium acetate, sodium hydrogen carbonate, sodium carbonate and sodium phosphate, or the corresponding potassium compounds. In addition, calcium oxide, calcium carbonate, calcium phosphate and magnesium carbonate can be used. Also organic bases such as pyridine, trimethylamine or triethylamine, N,N-di-isopropylmethylamine or collidine are suitable. Used in excess, these can also serve as solvents.

A masked amino group X" of the reaction product is subsequently modified by hydrolysis, reduction or reductive cleavage depending on the type of the group X" into the free amino group to convert this product into a compound of Formula I.

Examples of masked amino groups X" which can be converted by hydrolysis into the free amino group are acylamino groups such as the acetamido group; also lower alkoxycarbonylamino groups such as the ethoxycarbonylamino group; aryloxycarbonylamino groups such as the phenoxycarbonylamino group; or arylmethoxycarbonylamino groups such as the benzyloxycarbonylamino groups; or groups of corresponding thiocarbonic acid derivatives. Further examples are substituted methyleneamino groups such as the benzylideneamino or p-dimethylamino-benzylideneamino group.

The hydrolysis to liberate the amino group can be performed, e.g. in an acid medium such as by heating in dilute methanolic hydrochloric acid or, if X" is an alkoxycarbonylamino group, it can also be performed under mild alkaline conditions, e.g. with 1 N to 2 N sodium hydroxide solution.

An example for a group X" which can be converted into the amino group by reduction is the nitro group and examples of those groups which lead to the amino group by reductive cleavage are the phenylazo or p-dimethyl-amino-phenylazo groups. In general, these radicals can be reduced catalytically, e.g. by means of hydrogen in the presence of Raney nickel, palladium or platinum charcoal, in an inert solvent such as ethanol. Other usual reduction processes apart from these can be used, for example, the reduction of nitro groups or the reductive cleavage of azo groups by means of iron in acetic or hydrochloric acid.

Examples of starting materials of Formula III respectively IIIa wherein $n$ is 0 are 1-methyl-, 1-ethyl-, 1-propyl-, 1-isopropyl-, 1-butyl-, 1-isobutyl-, 1-sec. butyl-, 1-tert. butyl-, 1-pentyl-, 1-isopentyl-, 1-(1,1-dimethyl-propyl)-, 1-cyclopropyl-, 1-cyclopropylmethyl-, 1-cyclobutyl-, 1-cyclobutylmethyl-, 1-cyclopentyl-, 1-cyclopentylmethyl-, 1-cyclohexyl, 1-cyclohexylmethyl-, 1-(2-cyclohexylethyl)-, 1-cycloheptyl, 1-cycloheptylmethyl, 1-cyclo-octyl- and 1-cyclo-octylmethyl-, 1-cyclononyl-, 1-cyclodecyl-, 2-cyclopenten-1-yl-, 2-cyclohexen-1-yl-, 3-cyclohexen-1-yl-, 2-methyl-2-cyclohexen-1-yl-, 3-methyl-2-cyclohexen-1-yl-, 3-methyl-5-isopropyl-2-cyclohexen-1-yl- and 4-cyclo-octen-1-yl-2-amino-2-imidazoline.

1-methyl-, 1-cyclohexyl- and 1-(2-cyclohexylethyl)-2-aminoimidazoline have been described in the literature.

Other compounds are obtained analogously, e.g. by starting from ethylenediamines substituted corresponding to the definition of $R_5$. These N-substituted ethylenediamines are reacted, e.g. with carbon disulfide to form 1-substituted 2-imidazolidine thiones. These are converted with methyl iodide into correspondingly substituted 2-methylthio-2-imidazolinium iodides which, on reaction with ammonia, yield the desired compounds of Formula III respectively IIIa. These compounds are obtained by another process by condensation of N-substituted ethylenediamines with cyanogen chloride or bromide. A third process consists in reacting an N-substituted ethylenediamine with a salt of S-methyl-isothiourea to form the corresponding salt of an N-(2-substituted aminoethyl)-guanide and heating this until the ring is closed to form the corresponding salt of a 1-substituted 2-amino-imidazoline. In analogy to the production of the known homologous 1-dodecyl-2-amino-imidazoline, a fourth process is the reaction of the 2-imino-imidazolidine with a lower alkyl halide of suitable monocycloaliphatic halide.

Another process for the preparation of starting materials of Formula III respectively IIIa consists in reacting 2-chloropropionyl chloride with an amine $NH_2-R_5$. The obtained amide is reacted with benzylamine to give N-$R_5$-(2-benzylamino)-propionamide which is reduced with lithium aluminium hydride to the corresponding N-$R_5$-N'-benzyl-1,2-propylenediamine. The latter is debenzylated with palladium and hydrogen to N-$R_5$-1,2-propylenediamine, which in turn is reacted with cyanogen bromide to give 1-$R_5$-2-amino-4-methyl-imidazoline. The preparation of 1-$R_5$-2-amino-5-methyl-imidazoline is carried out by reacting 2-chloropropionyl chloride first with benzylamine to form 2-chloro-N-benzyl-propionamide, which is reacted with an amine $NH_2-R_5$ to the corresponding 2-$R_5$-amino-N-benzyl-propionamide. The latter is reduced with lithium aluminium hydride in tetrahydrofuran to give 1-benzylamino-2-$R_5$-amino-propane, which in turn is debenzylated with hydrogen and palladium to give 1-amino-2-$R_5$-amino-propane. This diamine is finally reacted with cyanogen bromide to form 1-$R_5$-2-amino-5-methyl-imidazoline. Similarly 2-amino-imidazolines substituted at $N_1$ and in 4- and 5-position are prepared analogously.

Starting materials of Formula III, respectively IIIa, wherein $n$ is 1, i.e. substituted 2-imino-hexahydropyrimidines, are also known in the literature or can be prepared in analogy to processes for the preparation of the imidazolines described hereinbefore.

Compounds of Formula I can be prepared according to a second process by condensing and cyclising a compound of the formula

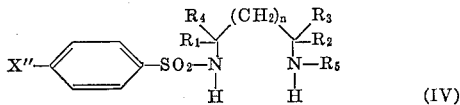 (IV)

wherein $n$, $R_1$, $R_2$, $R_3$, $R_4$ and $R_5$ have the meanings as defined under Formula I and $X''$ has the meaning as defined under Formula II, with a reactive functional derivative of cyanic acid, if necessary hydrolysing or reducing the reaction product obtained to transform the group $X''$ into a free amino group and, if desired, converting the compound obtained into an acid addition salt.

Cyanogen halides, particularly cyanogen chloride and cyanogen bromide, or esters of cyanic acid, particularly the phenyl ester are suitable reactive functional derivatives of cyanic acid. The reaction is preferably performed in the presence of a water miscible or water non-miscible inert organic solvent in the presence or absence of water. Suitable inert organic solvents are, e.g., hydrocarbons such as benzene, toluene, or xylene, lower alkanols such as methanol or ethanol, ether-type liquids such as diethyl ether, dioxane or tetrahydrofuran, chlorinated hydrocarbons such as methylene chloride, lower ketones, such as acetone or methyl ethyl ketone, carbonic acid esters such as acetic acid ethyl ester, carbonic acid nitriles such as acetonitrile, or sulfones such as tetrahydrothiophene-1,1-dioxide. The reaction can be performed in the presence or absence of an acid binding agent. As acid binding agents are suitable inorganic bases or salts, e.g. alkali hydroxides, alkali hydrogen carbonates, alkali carbonates or alkali phosphates such as the corresponding sodium or potassium compounds. Also suitable are calcium carbonate, calcium phosphate and magnesium carbonate.

The hydrolysis or reduction of a masked amino group $X''$ to the free amino group can be performed as described hereinbefore.

A first group of starting materials of Formula IV consists of N-(2-aminoethyl)-phenylsulfonamides, wherein phenyl is substituted in p-position by a group $X''$ and the amino group is substituted by a group $R_5$. These starting materials are prepared by reacting a correspondingly substituted 1-phenylsulfonyl-aziridine with a primary amine $NH_2$—$R_5$. Such aziridines have been described in the literature; e.g. 4'-(aziridine-1-sulfonyl)-acetanilide is described by R. Lehmann et al., Bull. Soc. Chim. Belges., 55, 52–97 (1946); C.A., 41, 5475f (1947) and 1-phenylsulfonyl-aziridine by J. Nelles et al., Germ. 695,331. Further aziridines of this type can be prepared analogously.

A second group of starting materials of Formula IV corresponds to the first group, however has additionally a lower alkyl group $R_1$ substituted in the ethylene moiety. These compounds are prepared by reacting a correspondingly substituted phenylsulfonyl chloride with a 2-alkyl-aziridine [A. Weissberger, Heterocyclic Compounds with Three- and Four-Membered Rings, part 1, John Wiley & Sons Inc., London (1964)] in the presence of diluted sodium hydroxide solution. Substituted 1-phenylsulfonyl-2-alkyl-aziridines are obtained which can be further reacted with primary amines $NH_2$—$R_5$ as described hereinbefore.

Starting materials of a third group of Formula IV wherein $n$ is 0 and $R_3$ and $R_4$ together form the tetramethylene group are prepared by condensing 2-aminocyclohexanol hydrochloride and N-acetyl-sulfanilyl chloride in pyridine to obtain N'-[2-(p-acetamidophenylsulfonyloxy)-cyclohexyl]-N⁴-acetylsulfanilamide and reacting the latter with a primary amine $NH_2$—$R_5$ in ethanolic solution whereby the p-acetamidophenylsulfonyloxy group is replaced by the —NH—$R_5$ group.

Compounds of Formula I wherein $n$ is 0 are produced according to a third process by condensing and cyclising a compound of the formula

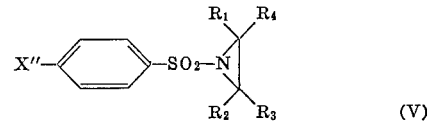 (V)

wherein $R_1$, $R_2$, $R_3$ and $R_4$ have the meanings as defined in Formula I and $X''$ has the meaning as defined in Formula II, with a compound of the formula

 (VI)

wherein $R_5$ has the meaning as defined in Formula I, or with an alkali or alkaline earth derivative thereof, if necessary hydrolysing or reducing the reaction product obtained to convert the masked amino group $X''$ into the free amino group and, if desired, converting the reaction product of Formula I, wherein $n$ is 0, into an acid addition salt.

Suitable alkali and alkaline earth derivatives of Formula VI are the lithium sodium, potassium and calcium derivatives. The condensation is preferably performed in an ether-type liquid, e.g. in ether, tetrahydrofuran, dioxane, anisole or ethylenglycol-dimethylether.

The masked amino groups $X''$ are the same as described hereinbefore and the conversion of these groups into the free amino group can be performed also as described hereinbefore.

Starting materials of Formula V can be prepared as described hereinbefore.

Compounds of Formula I are prepared according to a fourth process by condensing and cyclising a compound of formula

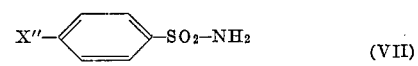 (VII)

wherein $X''$ has the meaning as defined in Formula II with a reactive ester of a hydroxy compound of formula

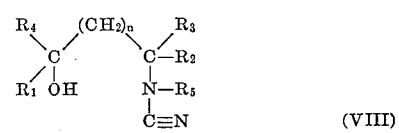 (VIII)

wherein $n$, $R_1$, $R_2$, $R_3$, $R_4$ and $R_5$ have the meanings as defined in Formula I, where applicable hydrolysing or reducing the reaction product obtained to convert the masked amino group $X''$ into the free amino group and, if desired, converting the reaction product of Formula I into an acid addition salt.

Suitable reactive esters of hydroxy compounds of Formula VIII are e.g. halogenides, particularly chlorides and bromides, or sulfonic acid esters such as methanesulfonic acid or o- and p-toluene-sulfonic acid esters. The condensation is performed preferably in a solvent miscible or not miscible with water and in the presence or absence of water. Suitable solvents are e.g. alkanols such as butanol, ether-type solvents, such as dioxane, diethyleneglycolmonomethylether, carbonic acid amides, such as N,N-dimethylformamide or sulfoxides such as dimethylsulfoxide. The condensation is advantageously carried out in the presence of an acid binding agent. Such acid binding agents are named in the first process of this invention. Furthermore also tertiary organic bases such as N,N-diisopropyl-ethyl-amine can be used.

Conversion of the masked amino group $X''$ into the amino group can be performed as described hereinbefore.

Reactive esters of the hydroxy compounds of Formula VIII to be used as starting materials in this fourth process are prepared e.g. by reacting 1-alkylaziridines with cyanogen halides in dioxane whereby the halogenides of compounds of Formula VIII are obtained. Particularly useful in this reaction are cyanogen chloride and cyanogen bromide.

Compounds of Formula I are prepared according to a fifth process by condensing and cyclising a reactive ester of a compound of the formula

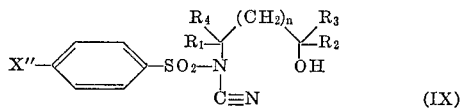

wherein $n$, $R_1$, $R_2$, $R_3$ and $R_4$ have the meanings as defined in Formula I and $X''$ has the meaning as defined in Formula II, with a primary amine $NH_2$—$R_5$, where applicable hydrolysing or reducing the reaction product obtained to convert the masked amino group $X''$ into the free amino group and, if desired, converting the reaction product of Formula I into an acid addition salt.

Suitable reactive esters of a hydroxy compound of Formula IX are, e.g. halogenides, particularly chlorides and bromides or sulfonic acid esters such as methanesulfonic acid or o- and p-toluenesulfonic acid esters. The condensation is performed preferably in a solvent. Suitable solvents are such solvents as named in the fourth process of this invention.

Advantageously the reaction is performed in the presence of an acid binding agent. Such agents are named also in the fourth process of this invention. Furthermore and preferably suitable acid binding agents are the primary bases $NH_2$—$R_5$ which are present in excess.

Conversion of the masked amino group $X''$ into the free amino group can be performed as described hereinbefore.

Reactive esters of the hydroxy compounds of Formula IX to be used as starting materials in this fifth process are prepared, e.g. by reaction of cyanogen bromide with aziridine in ether to give N-(2-bromoethyl)-cyanamides. The latter are reacted in acetone in the presence of dilute sodium hydroxide solution with a correspondingly substituted phenylsulfonylchloride whereupon the correspondingly substituted N-(2-chloroethyl)-N-cyanophenylsulfonamides are obtained.

Compounds of Formula I are prepared according to a sixth process by reacting a compound of the formula

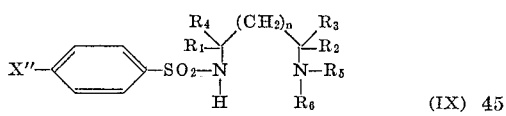

wherein $n$, $R_1$, $R_2$ $R_3$, $R_4$ and $R_5$ have the meanings as defined in Formula I, $X''$ has the meaning as defined in Formula II and $R_6$ is arylmethyl, diarylmethyl or triarylmethyl, according to von Braun with a cyanogen halide, whereby $R_6$ is replaced by the group —C≡N, cyclising the intermediate product obtained, where applicable hydrolysing or reducing the reaction product obtained to convert the protected amino group $X''$ into the free amino group and, if desired, converting the reaction product of Formula I into an acid addition salt.

Suitable groups, $R_6$ are e.g. the benzyl, benzhydryl, and the trityl group. Cyanogen chloride and cyanogen bromide are the preferred cyanogen halides used in this process. The reaction is advantageously performed in a solvent. Suitable solvents are e.g. hydrocarbons, such as benzene or toluene, or ether-type solvents such as ether, dioxane or tetrahydrofuran.

Conversion of the masked amino group $X''$ into the free amino group can be performed as described hereinbefore.

Compounds of Formula X to be used as starting materials in this sixth process are prepared, e.g. by reacting in dioxane-water correspondingly substituted 1-phenylsulfonylaziridines of Formula V with amines of the formula

wherein $R_5$ and $R_6$ have the meanings as defined in Formula X.

Compounds of Formula I are prepared according to a seventh process by thermal condensation and cyclisation of addition salts of the formula

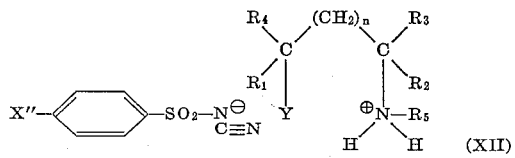

wherein $n$, $R_1$, $R_2$, $R_3$, $R_4$ and $R_5$ have the meanings as defined in Formula I, $X''$ has the meaning as defined in Formula II, and $y$ is chloro, bromo or iodo, where applicable converting the masked amino group $X''$ into the free amino group and, if desired, converting the reaction product of Formula I into an acid addition salt.

The thermal condensation and cyclisation is performed by heating the addition salt with or without a solvent. Suitable solvents are inert liquids with a high boiling point, e.g. ethers, such as diethyleneglycoldimethylether, or carbonic acid amides, such as N,N-dimethyl-formamide.

Conversion of the masked amino group $X''$ into the free amino group can be performed as described hereinbefore.

Compounds of Formula XII to be used as starting materials in this seventh process are prepared by reacting in water correspondingly substituted phenylsulfonyl chlorides with disodium cyanamide whereby the sodium derivatives of the corresponding N-cyano-phenylsulfonamides of Formula XIII

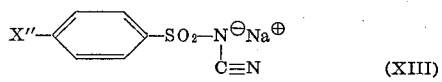

are formed.

The latter are reacted with acid addition salts of the formula

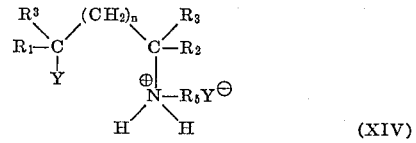

whereby the desired addition salts of Formula XII are formed. The symbols $n$, $R_1$, $R_2$, $R_3$, $R_4$, $R_5$, $X''$ and $Y$ in Formulas XIII and XIV have the meanings as defined in Formula XII.

If desired, the compounds of Formula I obtained according to the processes of the invention are subsequently converted into pharmaceutically acceptable acid addition salts. These salts are produced via conventional methods, e.g. by reacting the compounds of the Formula I with the equivalent amount of an acid in a suitable aqueous-organic or organic solvent such as methanol, ethanol, diethyl ether, chloroform or methylene chloride.

Suitable pharmaceutically acceptable acid addition salts are such salts which are derived from a compound of Formula I and a pharmaceutically acceptable acid, such as hydrochloric acid, hydrobromic acid, sulfuric acid, phosphoric acid, methane sulfonic acid, ethane sulfonic acid, β-hydroxy-ethane sulfonic acid, acetic acid, lactic acid, oxalic acid, succinic acid, fumaric acid, maleic acid, malic acid, tartaric acid, citric aid, benzoi acid, salicylic acid, phenylacetic acid, mandelic acid and embonic acid.

The new compounds of the invention have been found to have hypoglycemic activities. These hypoglycemic effects are illustratively demonstrated in rats by orally administering the test compound to groups of 5 to 6 animals which have been not fed for 24 hours. Blood samples are taken from a vein of the animals and the blood sugar content is determined according to the method of Hagedorn-Jensen with an autoanalyser. Thus it is shown that the compounds of the invention on oral administration in amounts of from 20 to 400 mg./kg. of bodyweight have significant hypoglycemic effects. Particular good blood sugar lowering properties have the following compounds:

1-sulfanilyl-2-imino-2-n-butyl-imidazolidine,
1-(p-chlorophenylsulfonyl)-2-imino-3-n-butyl-imidazolidine,
1-sulfanilyl-2-imino-3-n-butyl-5-ethyl-imidazolidine,
1-sulfanilyl-2-imino-3-i-butyl-imidazolidine,
1-sulfanilyl-2-imino-3-i-propylimidazolidine,
1-sulfanilyl-2-amino-3-t-butyl-imidazolidine,
1-sulfanilyl-2-imino-3-cyclopentyl-imidazolidine,
1-sulfanilyl-2-imino-3-n-butyl-4-methyl-imidazolidine,
1-sulfanilyl-2-imino-3-sec-butyl-4-methyl-imidazolidine,
1-sulfanilyl-3-imino-3-t-butyl-4-methyl-imidazolidine,
1-(p-methoxyphenylsulfonyl)-2-imino-3-n-butyl-imidazolidine,
1-(p-acetylphenylsulfonyl)-2-imino-3-n-butyl-imidazolidine and
1-sulfanilyl-2-imino-3-t-butyl-4-methyl-imidazolidine.

The toxicity of the compounds of the invention on oral administration is of favourable low order.

Safety and effectiveness in humans has been demonstrated with 1-sulfanilyl-2-imino-3-n-butyl-imidazolidine on oral administration to patients suffering from diabetes.

The new active substances are preferably administered orally. The daily dosages vary between about 1.5 and about 8 mg./kg. of bodyweight for adult mammals. Suitable dosage units such as dragées, tablets or capsules preferably contain 50–500 mg. of an active substance according to the invention, that is from 20 to 80% of a compound of Formula I. Such dosage units are produced by combining the active substance with, e.g., solid, pulverulent carriers such as lactose, saccharose, sorbitol, mannitol; starches such as potato starch, maize starch or amylopectin; laminaria powder or citrus pulp powder; cellulose derivatives or gelatine, optionally with the addition of lubricants such as magnesium or calcium stearate or polyethylene glycols of suitable molecular weights to form tablets or dragée cores. The latter are coated with, e.g. concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration are hard or soft gelatine capsules. The former contain the active substance advantageously in the form of a granulate optionally in admixture with diluents such as maize tarch, and lubricants such as talcum or magnesium stearate and, optionally stabilising agents such as sodium metabisulfite ($Na_2S_2O_5$) or ascorbic acid. In soft capsules the active substance is preferably dissolved or suspended in suitable liquids such as liquid polyethylene glycols, to which stabilising agents can be added.

The following examples will serve to further typify the nature of the present invention but should not be construed as a limitation on the scope thereof. If not otherwise denoted by an alkyl group is mean a straight chain n-alkyl group.

EXAMPLE 1

(a) 355 g. of 1-butyl-2-amino-2-imidazoline hydrochloride are added in portions to a solution of 198 g. of sodium hydroxide in 2 litres of water. A solution of 443 g. of p-nitrobenzene sulphochloride in 2 litres of acetone is then added dropwise within 15 minutes and the red reaction mixture obtained is heated for 3 hours at 70°, whereupon the acetone distills off. The residue is poured onto ice and the crude product is filtered off under suction. To purify, it is taken up in 2 litres of 2 N hydrochloric acid, insoluble parts are filtered off and washed with water and the free base is precipitated from the hydrochloric acid solution by pouring it onto ice and concentrated ammonia. The precipitate is filtered off under suction, washed with water and recrystallised from benzene. The pure 1 - (p-nitro-phenylsulphonyl)-2-imino-3-butyl-imidazolidine obtained melts at 98–99°.

(b) 390 g. of the nitro compound produced according to (a) are dissolved in 15 litres of ethanol and the nitro group is reduced with hydrogen at 20° and normal pressure in the presence of platinum charcoal. The catalyst is filtered off and the filter residue is washed with ethanol. The filtrate is concentrated in vacuo, 1 litre of 2 N hydrochloric acid is added to the residue, the crude base, and the insoluble parts are filtered off and washed with water. The pure base is precipitated in crystalline form from the hydrochloric acid filtrate with 2 N sodium hydroxide solution. It is filtered off under suction, washed with water and dried in vacuo at 90°. The 1-sulphanilyl-2-imino-3-butyl-imidazolidine obtained melts at 179–181°.

EXAMPLE 2

(a) 60 ml. of 5 N sodium hydroxide and 30 g. of ice are added to 20.5 g. of 1-cyclohexyl-2-amino-2-imidazoline hydrochloride and a solution of 26 g. of p-nitro-benzene sulphochloride in 100 ml. of acetone is added to the mixture. The crude 1-(p-nitrophenylsulphonyl)-2-imino-3-cyclohexyl-imidazoline immediately crystallises. It is filtered off under suction, washed with water and recrystallised from a small amount of ethanol M.P. 160–161° with decomposition.

(b) 35.2 g. of the nitro compound produced according to (a) are dissolved in 1 litre of ethanol and the solution is hydrogenated with hydrogen at 20° and normal pressure, in the presence of palladium charcoal (50% palladium), until no more hydrogen is taken up. The catalyst is then filtered off and washed with ethanol and the filtrate is evaporated in vacuo. Recrystallisation of the residue from dioxane/water yields pure 1-sulphanilyl-2-imino-3-cyclohexyl-imidazolidine, M.P. 181–183°.

EXAMPLE 3

(a) 10.0 g. of 1-butyl-2-amino-2-imidazoline hydrochloride are added to 5.5 g. of sodium hydroxide in 55 ml. of water. 15 g. of p-acetylamino-benzene sulphochloride dissolved in 100 ml. of warm acetone are added to the clear solution obtained whereupon the temperature of the reaction mixture rises and a thick, white precipitate is formed. The mixture is heated for half an hour at 90–95° and then concentrated in vacuo. The crystal slurry which remains is filtered off under suction, washed with water and recrystallised from 1 litre of ethanol. Colourless p-(2-imino - 3 - butyl-1-imidazolidinylsulphonyl)-acetanilide is obtained which melts at 243–244°.

(b) 15 g. of the acetanilide derivative produced according to (a) are heated in 50 ml. of 2 N hydrochloric acid for 1 hour at 80°. The solution is then cooled to 20° and made alkaline with 2 N sodium hydroxide solution. The precipitate formed is filtered off under suction and washed with water. The filter residue is recrystallised from ethanol whereupon 1-sulphanilyl-2-imino-3-butyl-imidazolidine is obtained, M.P. 179–181°.

EXAMPLE 4

(a) 10.0 g. of 1-butyl-2-amno-2-imidazoline hydrochloride are added to 5.5 g. of sodium hydroxide in 55 ml. of water. 12.5 g. of N-methoxycarbonyl-sulphanil chloride in 100 ml. of acetone are added to the clear solution obtained. The solution turns yellow for a short time whereupon a thick, colourless precipitate immediately forms. 100 ml. of water are added to the mixture, the precipitate is filtered off and washed with water. Recrystallised from methanol, the pure p-(2-imino-3-butyl-1-imidazolidinylsulphonyl)-carbanilic acid ethyl ester obtained melts at 198–200°.

(b) 17.7 g. of the methoxycarbonyl compound produced according to (a) are refluxed for 1 hour in 100 ml. of 90% methanol containing 6 g. of sodium hydroxide. The reaction mixture obtained is concentrated in vacuo and 50 ml. of water are added. The crystalline precipitate formed is filtered off under suction and washed with 100 ml. of water. After recrystallisation from ethanol, the 1-sulphanilyl-2-imino-3-butyl-imidazolidine obtained melts at 179–181°.

EXAMPLE 5

4' - (2-imino-3-sec. butyl-1-imidazolidinylsulphonyl)-acetanilide (M.P. 250–251°) is obtained analogously to Example 3(a) from 10 g. of 1-sec. butyl-2-amino-2-imidazoline hydrochloride and 15 g. of p-acetylamino-benzene sulphochloride. It is hydrolysed according to Example 3(b) to form 1-sulphanilyl-2-imino-3-sec. butyl-imidazolidine, M.P. 173–173.5°.

EXAMPLE 6

(a) 13.5 g. of 1-methyl-2-amino-2-imidazoline hydrochloride are dissolved in 150 ml. of water and 14 g. of sodium hydroxide are added. The solution of 23.4 g. of p-acetylaminobenbene sulphochloride in 300 ml. of acetone is added whereupon an exothermic reaction occurs and a thick crystal slurry precipitates. The mixture is refluxed for 1 hour, cooled and diluted with 250 ml. of water. The crystals are filtered off and recrystallised from dimethyl formamide/water. 1 - (p-acetamidophenylsulphonyl) - 2 - imino-3-methyl-imidazolidine melts at 278–279°.

(b) 29.6 g. of 1 - (p-acetamidophenylsulphonyl)-2-imino-3-methyl-imidazolidine are dissolved in 240 ml. of 2 N hydrochloric acid and the solution is heated at 80° for 30 minutes. After cooling, the solution is stirred into 300 ml. of 2 N sodium hydroxide solution. The precipitated crystals are filtered off and recrystallised from methanol/water. The pure 1 - sulphanilyl-2-imino-3-methyl-imidazolidine melts at 209–210°.

EXAMPLE 7

Analogously to Example 6, 1-(p-acetamidophenylsulphonyl)-2-imino-3-ethyl-imidazolidine (which decomposes at 250°) is obtained from 14.9 g. of 1-ethyl-2-amino-2-imidazoline hydrochloride in 150 ml. of water and 10 g. of sodium hydroxide solution with 23.4 g. of p-acetylaminobenzene sulphochloride in 300 ml. of acetone. It is hydrolysed by heating at 80° for 30 minutes in 2 N hydrochloric acid to form 1 - sulphanilyl-2-imino-3-ethyl-imidazolidine, M.P. 172–173°.

EXAMPLE 8

1-(p-acetamidophenylsulphonyl) - 2 - imino-3-cyclohexen-1-yl-imidazolidine is obtained analogously to Example 6 from 20.2 g. of 3 - cyclohexen-1-yl-2-amino-2-imidazoline hydrochloride in 150 ml. of water and 10 g. of sodium hydroxide solution with 23.4 g. of p-acetamidobenzene sulphochloride in 300 ml. of acetone. It is saponified by heating at 80° for 30 minutes in 2 N hydrochloric acid to form 1 - sulphanilyl-2-imino-3-cyclohexen-1-yl-imidazolidine.

EXAMPLE 9

(a) 31.3 g. of $N^1$-(2-butylamino-ethyl)-$N^4$-acetyl-sulphanilamide are dissolved in 100 ml. of 2 N sodium hydroxide solution and 10.6 g. of cyanogen bromide is added with cooling at 20–30°. The crude product precipitates as crystals. It is filtered by suction after 30 minutes and recrystallised from N,N-dimethylformamide. The resulting 4'-(2 - imino-3-butyl-imidazolidin-1-ylsulphonyl)-acetanilide melts at 243–244°.

(b) 33.8 g. of the acetanilide obtained according to (a) are heated with 100 ml. of 2 N hydrochloric acid for one hour to 80°. The reaction mixture is then cooled to 20° and rendered alkaline with 2 N sodium hydroxide solution. The crude base which precipitates is removed by filtration, washed with water and recrystallised from ethanol. The resulting 1-sulphanilyl-2-imino-3-butyl-imidazolidine melts at 179–181°.

(c) The starting compound for (a) is obtained as follows:

24.0 g. of 4'-(aziridin-1-ylsulphonyl)-acetanilide [cf. R. Lehmann et al., Bull. Soc. Chim. Belges, 55, 52–97 (1946); C.A., 41, 5475f (1947)] are dissolved in the cold in 100 ml. of dioxane and 15 ml. of water and the solution is added dropwise to 100 ml. of butylamine. The reaction mixture is then refluxed for one hour and the excess butylamine as well as the dioxane is removed by distillation. The crystalline residue is recrystallised from ethyl acetate to yield pure $N^1$-(2 - butylamino-ethyl)-$N^4$-acetyl-sulphanilamide melting at 97–98°.

EXAMPLE 10

(a) Analogously to Example 9(a), 4'-(2-imino-3-methyl-imidazolidin-1-ylsulphonyl)-acetanilide having a melting point of 266–267° is obtained from 27.1 g. of $N^1$-(2-methylamino-ethyl)-$N^4$-acetyl-sulphanilamide and 10.6 g. of cyanogen bromide.

(b) 29.6 g. of the acetanilide obtained according to (a) are allowed to stand for 48 hours at 20° with 200 ml. of 8 N ethanolic hydrochloric acid. The reaction mixture is then concentrated under vacuum, the crystalline residue is dissolved in water, and the solution is rendered alkaline with 2 N sodium hydroxide solution. The crude free base precipitates; it is filtered by suction and recrystallised from methanol/water to yield the pure 1-sulphanilyl-2-imino-3-methyl-imidazolidine melting at 209–211°.

(c) The starting material used under (a), namely $N^1$-(2-methylamino-ethyl)-$N^4$-acetyl-sulphanilamide having a melting point of 100–102° (from ethyl acetate), is obtained analogously to Example 9(c) from 24 g. of 4-aziridin-1-ylsulphonyl)-acetanilide and 100 ml. of 40% aqueous methylamine.

EXAMPLE 11

(a) Analogously to Example 9(a), 4'-(2-imino-3-tert. butyl-5 - methyl-imidazolidin-1-ylsulphonyl)-acetanilide, M.P. 227–229°, is obtained from 32.7 g. of $N^1$-(1-methyl-2-tert. butylamino-ethyl)-$N^4$ - acetyl-sulphanilamide and 10.6 g. of cyanogen bromide.

(b) 35.2 g. of the acetanilide obtained according to (a) are added with stirring to 125 g. of 50% sulphuric acid which has been heated to 40°. The mixture is heated for 2 hours at 50° and the solution is poured with stirring into 750 ml. of water. The crude product precipitates as the sulphate. The pH of the reaction mixture is adjusted to 6.3 with 10 N sodium hydroxide solution. The mixture, with the exception of a slight impurity, dissolves completely; it is stirred for 15 minutes with 2 g. of active charcoal and filtered over Hyflo (purified diatomaceous earth). The filtrate is rendered alkaline with 10 N sodium hydroxide solution. The crude product precipitates. It is filtered, washed with water, dried at 90° and recrystallised from ethyl acetate. The resulting 1-sulphanilyl-2-imino-3-tert. butyl-5-methyl-imidazolidine melts at 145–146°.

(c) The starting compound mentioned under (a) is obtained as follows: A solution of 23.3 g. of N-acetyl-sulphanilyl-chloride in 70 ml. of acetone is added dropwise with stirring at −10° to 0° to 5.6 g. of 2-methyl-aziridine in 30 ml. of 4 N sodium hydroxide solution. The reaction is stirred at 0° for 2 more hours and then poured on to 400 ml. of ice water. The resulting suspension is filtered, the precipitate, crude 4-(2-methyl-aziridin-1-ylsulphonyl)-acetanilide, is washed with water and then further processed immediately, since it polymerises easily.

(d) The crude product obtained according to (c) is converted analogously to Example 9(c) with 100 ml. of tert. butylamine to $N^1$-(1-methyl-2-tert. butylamino-ethyl)-$N^4$-acetyl-sulphanilamide, M.P. 93–95°.

EXAMPLE 12

(a) A solution of 11.3 g. of cyanogen bromide in 11.5 ml. of ether is added dropwise during 10 minutes to a solution of 34 g. of $N^4$-acetyl-$N^1$-[2-(3-ethoxy-propyl-amino)-ethyl]-sulphanilamide in 175 ml. of dioxane. The resulting emulsion is refluxed in a bath of 70° for 1½ hours. The reaction mixture is then concentrated. The residual yellow resin is dissolved in 175 ml. of water, the colour of the solution is removed with active charcoal, the solution is filtered and rendered alkaline at 0° with 2 N sodium hydroxide solution. The precipitated crystals are separated by filtration, washed with water and recrystallised from ethanol, yelding 4-[2-imino-3-(3-ethoxy-propyl]-imidazolidin-1-ylsulphonyl) - acetanilide, M.P. 223–225°.

(b) 36.8 g. of the acetanilide obtained according to (a) are dissolved while stirring for 15 minutes in 200 ml. of 8 N ethanolic hydrochloric acid. The solution is allowed to stand at room temperature for about 80 hours, and then concentrated. The residual brown resin is dissolved in water, the colour of the solution is removed with active charcoal, and the solution is filtered. The clear filtrate which has been cooled with ice is carefully rendered alkaline with concentrated sodium hydroxide solution and the product which precipitates, crystallising after several minutes, is separated by filtration, washed with water and dried. The resulting 1-sulphanilyl-2-amino-3-(3-ethoxy-propyl)-imidazolidine melts after recrystallisation from ethanol at 148–150°.

(c) The starting product for (a) is obtained as follows: 200 ml. of 3-ethoxy-propylamine are heated to 80° and then while stirring 24.0 g. of 4-(aziridin-1-ylsulphonyl)-acetanilide in 128 ml. of dioxane/water (9:1) are added thereto during 30 minutes. The yellow solution is then heated at 80° for another 1½ hours and then concentrated. The residual oil is purified by elution chromatography on a column of 400 g. of silica gel. The N,N-bis-[2-($N^4$-acetyl-sulphanilamido) - ethyl]-3-ethoxy-propyl-amine is first eluted with chloroform/ethanol (9:1), and then the $N^4$-acetyl-$N^1$-[2-(3-ethoxy-propyl-amino)-ethyl]-sulphanilamide which is obtained as an oil is eluted with chloroform/ethanol (9:1) and (4:1).

EXAMPLE 13

(a) Analogously to Example 12(a), 4'-hexahydro-2-imino-benzimdazolin - 1 - ylsulphonyl)acetanilide is obtained from 42.6 g. of $N^1$-(2-benzylamino-cyclohexyl)-$N^4$-acetyl-sulphanilamide and 10.6 g. of cyanogen bromide.

(b) 42.7 g. of the crude acetanilide obtained according to (a) are hydrolysed analogously to Example 10(b) with 200 ml. of ethanolic hydrochloric acid to yield 1-sulphanilyl-2-imino - 3 - benzyl-hexahydro-benzimidazoline, M.P. 208–210°.

(c) The starting material for (a) is obtained as follows: 15.15 g. of 2-amino-cyclohexanol-hydrochloride are suspended in 120 ml. of absolute pyridine and the suspension is cooled to −5°. During half an hour 55.0 g. of N-acetyl-sulphanilyl chloride are introduced into this mixture at −5 to 0°. A slightly exothermic reaction takes place and the suspension dissolves. The solution is stirred for 4 hours at 0–5° in an ice bath and then poured on to 900 ml. of ice water. A yellow sticky crude product precipitates; the crude product is extracted three times with ethyl acetate. The organic extract is washed once with water, twice with 6 N hydrochloric acid and twice with water, dried over sodium sulphate and concentrated. Recrystallisation of the crystalline residue from methanol yields pure $N^1$-[2-(p-acetamido - phenylsulphonyloxy)-cyclohexyl]-$N^4$-acetyl-sulphanilamide.

(d) 50.9 g. of the sulphanilamide obtained according to (c) are suspended in 250 ml. of ethanol and treated with 157 g. of benzylamine. The mixture dissolves and a slightly exothermic reaction takes place. The solution is allowed to stand for 2 hours at room temperature, it is then heated for 4 hours to 50° and finally concentrated. The residue is taken up in methylene chloride and concentrated ammonia and the organic phase is extracted with 2 N hydrochloric acid. The hydrochloric acid extract is purified with active charocal and filtered. The filtrate is treated with ammonia; a resin precipitates. Several drops of methylene chloride are added to the resulting suspension and the resin is triturated; it then crystallises. The crystals are filtered, washed with water and recrystallised from isopropanol/methylene chloride. $N^1$-(2-benzylamino-cyclohexyl) - $N^4$ - acetyl-sulphanilamide having a melting point of 180–182° is obtained.

EXAMPLE 14

(a) Analogously to Example 9(a), starting from 28.5 g. of $N^1$-(2-ethylamino-ethyl)-$N^4$-acetyl-sulphanilamide, M.P. 108–110° (from ethyl acetate), and 10.6 g. of cyanogen bromide, 4'-(2-imino-3-ethyl - imidazolidin-1-ylsulphonyl)-acetanilide, M.P. 267–269° (from ethanol), is obtained. 31.0 g. of the latter are hydrolysed analogously to Example 9(b) with 100 ml. of 2 N hydrochloric acid to give 1-sulphanilyl-2-imino-3-ethyl-imidazolidine, M.P. 171–172° (from methanol/water), as end product.

(b) The starting material for (a) is obtained analogously to Example 9(c) from 24.0 g. of 4'-(aziridin-1-ylsulphonyl)-acetanilide and 100 ml. of ethylamine.

EXAMPLE 15

(a) Analogously to Example 9(a), starting from 29.7 g. of $N^1$-(2-allylamino-ethyl)-$N^4$-acetyl - sulphanilamide (crude product), and 10.6 g. of cyanogen bromide, 4'-(2-imino-3-allyl-imidazolidin-1-ylsulphonyl) - acetanilide, M.P. 247–249° (from methanol), is obtained. 32.2 g. of the latter are hydrolysed analogously to Example 9(b) with 100 ml. of 2 N hydrochloric acid to give 1-sulphanilyl-2-imino-3-allyl-imidazolidine, M.P. 158–160° (from methanol/water), as end product.

(b) The starting material for (a) is obtained analogously to Example 9(c) from 24.0 g. of 4'-(aziridin-1-ylsulphonyl)-acetanilide and 150 ml. of allylamine.

EXAMPLE 16

(a) Analogously to Example 9(a), starting from 29.9 g. of $N^1$-(2-propylamino-ethyl) - $N^4$ - acetyl-sulphanilamide, M.P. 89–90° (from ethyl acetate), and 10.6 g. of cyanogen bromide, 4'-(2-imino-3-propyl-imidazolidin-1-ylsulphonyl)-acetanilide, M.P. 253–255°, is obtained. 32.4 g. of the latter are hydrolysed analogously to Example 10(b) with 8 N ethanolic hydrochloric acid to give 1-sulphanilyl-2-imino-3-propyl-imidazolidine, M.P. 164–166° (from methanol), as end product.

(b) The starting material for (a) is obtained analogously to Example 9(c) from 24.4 g. of 4'-(aziridin-1-ylsulphonyl)-acetanilide and 100 ml. of propylamine.

EXAMPLE 17

(a) Analogously to Example 9(a), starting from 29.9 g. of $N^1$ - (2 - isopropylamino-ethyl)-$N^4$-acetyl-sulphanilamide, M.P. 91–93° (from ethyl acetate), and 6.2 g. of cyanogen chloride, 4'-(2-imino-3-isopropyl-imidazolidin-1-ylsulphonyl)-acetanilide, M.P. 253–254°, is obtained. 32.4 g. of the latter are hydrolysed analogously to Example 10(b) with 200 ml. of 8 N ethanolic hydrochloric acid to give 1-sulphanilyl-2-imino-3-isopropyl-imidazolidine, M.P. 183–184°, as end product.

(b) The starting material for (a) is obtained analogously to Example 9(c) from 24.0 g. of 4'-aziridin-1-ylsulphonyl)-acetanilide and 100 ml. of isopropylamine.

EXAMPLE 18

(a) Analogously to Example 9(a), starting from 31.3 g. of $N^1$-(2-isobutylamino-ethyl)-$N^4$-acetyl-sulphanilamide, M.P. 70–73° (from ethyl acetate/ether), and 10.6 g. of cyanogen bromide, 4'-(2-imino-3-isobutyl-imidazolidin-1-ylsulphonyl)-acetanilide, M.P. 264–265° (from methanol), is obtained. 33.8 g. of the latter are hydrolysed analogously to Example 10(b) with 200 ml. of 8 N ethanolic hydrochloric acid to give 1-sulphanilyl- 2-imino-3-isobutyl-imidazolidine, M.P. 146–147° (from methanol), as end product.

(b) The starting material for (a) is obtained analogously to Example 9(c) from 27.6 g. of $N^1$-(2-chloroethyl)-$N^4$-acetylsulphanilamide and 100 ml. of isobutylamine.

EXAMPLE 19

(a) Analogously to Example 9(a), starting from 31.3 g. of $N^1$-(2-sec. butylamino-ethyl) - $N^4$ - acetyl-sulphanilamide, M.P. 70–72°, and 10.6 g. of cyanogen bromide, 4' - (2-imino-3-sec. butylimidazolidin-1-ylsulphonyl)-acetanilide, M.P. 265–266° (from methanol), is obtained 33.8 g. of the latter are hydrolysed analogously to Example 10(b) with 200 ml. of 8 N ethanolic hydrochloric acid to yield the end product, 1-sulphanilyl-2-imino-3-sec. butyl-imidazolidine, M.P. 173–173.5° (from methanol).

(b) The starting material for (a) is obtained analogously to Example 9(c) from 24.0 g. of 4'-(aziridin-1-ylsulphonyl)-acetanilide and 100 ml. of sec. butylamine.

EXAMPLE 20

(a) Analogously to Example 9(a), starting from 31.3 g. of $N^1$-(2-tert. butylamino-ethyl)-$N^4$-acetyl-sulphanilamide, M.P. 98–101° (from ethyl acetate), and 6.5 g. of cyanogen chloride in place of cyanogen bromide, 4'-(2-imino - 3 - tert. butylimidazolidin - 1 - ylsulphonyl)-acetanilide, M.P. 245–247° (from methanol/water), is obtained. 33.8 g. of the latter are hydrolysed analogously to Example 9(b) with 100 ml. of 2 N hydrochloric acid to yield 1-sulphanilyl - 2 - imino-3-tert. butylimidazolidine, M.P. 187–189° (from methanol/water), as end product.

(b) The starting material for (a) is obtained analogously to Example 9(c) from 24.0 g. of 4'-(aziridin-1-ylsulphonyl)-acetanilide and 100 ml. of tert. butylamine.

EXAMPLE 21

(a) Analogously to Example 9(a), starting from 32.7 g. of $N^1$-(2-pentylamino-ethyl)-$N^4$-acetyl-sulphanilamide, M.P. 103–104° (from ethyl acetate), and 10.6 g. of cyanogen bromide, 4'-(2-imino - 3 - pentyl-imidazolidin-1-ylsulphonyl)-acetanilide, M.P. 248–250° (from methanol), is obtained. 35.2 g. of the latter are hydrolysed analogously to Example 9(b) with 100 ml. of 2 N hydrochloric acid to obtain 1-sulphanilyl-2-imino-3-pentyl-imidazolidine, M.P. 167–168° (from methanol), as end product.

(b) The starting material is obtained analogously to Example 9(c) from 24.0 g. of 4'-(aziridin-1-ylsulphonyl)-acetanilide and 100 ml. of pentylamine.

EXAMPLE 22

(a) Analogously to Example 9(a), starting from 34.1 g. of $N^1$-(2-hexylamino-ethyl) - $N^4$ - acetyl-sulphanilamide, M.P. 98–99° (from ethyl acetate), and 11.9 g. of phenyl cyanate in place of cyanogen bromide, 4'-(2-imino-3-imidazolidin - 1 - ylsulphonyl)-acetanilide, M.P. 236–238°, is obtained. 36.6 g. of the latter are hydrolysed analogously to Example 10(b) with 200 ml. of ethanolic hydrochloric acid to obtain 1-sulphanilyl-2-imino-3-hexyl-imidazolidine, M.P. 182–183° as end product.

(b) The starting material for (a) is obtained analogously to Example 9(c) from 24.0 g. of 4'-(aziridin-1-ylsulphonyl)-acetanilide and 200 ml. of hexylamine.

EXAMPLE 23

(a) Analogously to Example 9(a), starting from 36.9 g. of $N^1$-(2-octylamino-ethyl)-$N^4$-acetyl-sulphanilamide, M.P. 83–84° (from ethyl acetate), and 10.6 g. of cyanogen bromide, 4'-(2-imino - 3 - octyl-imidazolidin-1-ylsulphonyl)-acetanilide, M.P. 229–230° (from methanol), is obtained. 39.4 g. of the latter are hydrolysed analogously to Example 10(b) with 200 ml. of 8 N ethanolic hydrochloric acid to obtain 1-sulphanilyl-2-imino-3-octyl-imidazolidine, M.P. 143–144°, as end product.

(b) The starting material for (a) is obtained analogously to Example 9(c) from 24.0 g. of 4'-(aziridin-1-ylsulphonyl)-acetanilide and 150 ml. of octylamine.

EXAMPLE 24

(a) Analogously to Example 9(a), starting from 39.7 g. of $N^1$-(2-decylamino-ethyl)-$N^4$-acetyl-sulphanilamide, M.P. 87–88° (from ethyl acetate), and 11.9 g. of phenyl cyanate in place of cyanogen bromide, 4'-(2-imino-3-imidazolidin-1-ylsulphonyl)-acetanilide, M.P. 216–217°, is obtained. 42.2 g. of the latter are hydrolysed analogously to Example 10(b) with 200 ml. of ethanolic hydrochloric acid to obtain 1-sulphanilyl-2-imino-3-decyl-imidazolidine, M.P. 119–120°.

(b) The starting material for (a) is obtained analogously to Example 9(c) from 24.0 g. of 4'-(aziridin-1-ylsulphonyl)-acetanilide and 200 ml. of decylamine.

EXAMPLE 25

(a) Analogously to Example 9(a), starting from 42.5 g. of $N^1$-(dodecylamino-ethyl)-$N^4$-acetyl-sulphanilamide (crude product) and 10.6 g. of cyanogen bromide, 4'-(2-imino-3-dodecyl-imidazolidin - 1 - ylsulphonyl)-acetanilide, M.P. 218–219° (from dioxane), is obtained. 45.0 g. of the latter are hydrolysed analogously to Example 10(b) with 200 ml. of ethanolic hydrochloric acid to obtain 1-sulphanilyl-2-imino-3-dodecyl-imidazolidine, M.P. 110–111° (from ethyl acetate), as end product.

(b) The starting material for (a) is obtained analogously to Example 9(c) from 24.0 g. of 4'-(aziridin-1-ylsulphonyl)-acetanilide and 200 ml. of dodecylamine.

EXAMPLE 26

(a) Analogously to Example 9(a), starting from 32.5 g. of $N^1$-(2-cyclopentylamino-ethyl)-$N^4$-acetyl-sulphanilamide (M.P. of the hydrochloride: 215–217°), and 10.6 g. of cyanogen bromide, 4'-(2-imino-3-cyclopentyl-imidazolidin-1-ylsulphonyl)-acetanilide, M.P. 261–263°, is obtained. 35.0 g. of the latter are hydrolysed analogously to Example 9(b) with 100 ml. of 2 N hydrochloric acid to obtain 1-sulphanilyl-2-imino-3-cyclopentyl-imidazolidine, M.P. 192–193°, as end product.

(b) The starting material for (a) is obtained analogously to Example 9(c) from 24.0 g. of 4'-(aziridin-1-ylsulphonyl)-acetanilide and 100 ml. of cyclopentylamine.

EXAMPLE 27

(a) Analogously to Example 9(a), starting from 33.9 g. of $N^1$-(2-cyclohexylamino-ethyl)-$N^4$-acetyl-sulphanilamide, M.P. 135–136° (from ethyl acetate), and 10.6 g. of cyanogen bromide, 4'-(2-imino-3-cyclohexyl-imidazolidin-1-ylsulphonyl)-acetanilide, M.P. 283–284° (from methanol), is obtained. 36.4 g. of the latter are hydrolysed analogously to Example 9(b) with 100 ml. of 2 N hydrochloric acid to obtain 1-sulphanilyl-2-imino-3-cyclohexyl-imidazolidine, M.P. 178–179°, as end product.

(b) The starting material for (a) is obtained analogously to Example 9(c) from 24.0 g. of 4'-aziridin-1-ylsulphonyl)-acetanilide and 100 ml. of cyclohexylamine.

EXAMPLE 28

(a) Analogously to Example 9(a), starting from 33.7 g. of $N^1$-[2-(3-cyclohexen-1-ylamino)-ethyl]-$N^4$-acetyl-sulphanilamide, M.P. 121–122°, and 10.6 g. of cyanogen bromide, 4'-[2-imino-3-(3-cyclohexen-1-yl)-imidazolidin-1-ylsulphonyl]-acetanilide, M.P. 283–284°, is obtained. 36.2 g. of the latter are hydrolysed analogously to Example 10(b) with 200 ml. of 8 N ethanolic hydrochloric acid to obtain 1-sulphanilyl-2-imino-3-(3-cyclohexen-1-yl)-imidazolidine, M.P. 172–173° (from methanol), as end product.

(b) The starting material for (a) is obtained analogously to Example 9(c) from 24.0 g. of 4'-(aziridin-1-ylsulphonyl)-acetanilide and 100 ml. of (3-cyclohexen-1-yl)-amine.

EXAMPLE 29

(a) Analogously to Example 9(a), starting from 39.0 g. of N¹-[2-(1-adamantylamino)-ethyl] - N⁴ - acetyl-sulphanilamide (crude product) and 10.6 g. of cyanogen bromide, 4'-[2-imino-3-(1-adamantyl)-imidazolidin-1-ylsulphonyl]-acetanilide, M.P. 240–243°, is obtained. 29.6 g. of the latter are hydrolysed analogously to Example 10(b) with 200 ml. of 8 N ethanolic hydrochloric acid to obtain 1-sulphanilyl-2-imino-3-(1-adamantyl)-imidazolidine, M.P. 240–243°, as end product.

(b) The starting material for (a) is obtained analogously to Example 9(c) from 24.0 g. of 4'-(aziridin-1-ylsulphonyl)-acetanilide and 15.0 g. of 1-amino-adamantane.

EXAMPLE 30

(a) Analogously to Example 12(a), starting from 33.1 g. of N¹-[2-(2-methylthio-ethylamino)-ethyl]-N⁴-acetyl-sulphanilamide (crude product) and 10.6 g. of cyanogen bromide, 4'[2-imino-3-(2-methylthio-ethyl)-imidazolidin-1-ylsulphonyl]-acetanilide, M.P. 257–259°, is obtained. 35.6 g. of the latter are hydrolysed analogously to Example 12(b) with 200 ml. of 8 N ethanolic hydrochloric acid to obtain 1-sulphanilyl-2-imino-3-(2-methylthio-ethyl)-imidazolidine, M.P. 153–155°, as end product.

(b) The starting material for (a) is obtained analogously to Example 12(c) from 24.0 g. of 4'-(aziridin-1-ylsulphonyl)-acetanilide and 200 ml. of 2-methylthio-ethylamine.

EXAMPLE 31

(a) Analogously to Example 12(a), starting from 31.5 g. of N¹-[2-(2-methoxy-ethylamino)-ethyl] - N⁴ - acetyl-sulphanilamide (crude product) and 10.6 g. of cyanogen bromide, 4'-[2-imino-3-(2-methoxy-ethyl)-imidazolidin-1-ylsulphonyl]-acetanilide, M.P. 230–232°, is obtained. 34.0 g. of the latter are hydrolysed analogously to Example 12(b) with 200 ml. of 8 N ethanolic hydrochloric acid to obtain 1-sulphanilyl-2-imino-3-(2-methoxy-ethyl)-imidazolidine, M.P. 159–161°, as end product.

(b) The starting material for (a) is obtained analogously to Example 12(c) from 24.0 g. of 4'-(aziridin-1-ylsulphonyl)-acetanilide and 200 ml. of 2-methoxy-ethylamine.

EXAMPLE 32

(a) Analogously to Example 12(a), starting from 32.9 g. of N¹-[2-(3-methoxy-propylamino)-ethyl]-N⁴-acetyl-sulphanilamide (crude product) and 10.6 g. of cyanogen bromide, 4'-[2-imino-3-(3-methoxy-propyl)-imidazolidin-1-ylsulphonyl]-acetanilide, M.P. 233–235°, is obtained. 35.4 g. of the latter are hydrolysed analogously to Example 12(b) with 200 ml. of 8 N ethanolic hydrochloric acid to obtain 1-sulphanilyl-2-imino-3-(3-methoxy-propyl)-imidazolidine, M.P. 132–134°, as end product.

(b) The starting material for (a) is obtained analogously to Example 12(c) from 24.0 g. of 4'-(aziridin-1-ylsulphonyl)-acetanilide and 200 ml. of 3-methoxy-propylamine.

EXAMPLE 33

(a) Analogously to Example 12(a), starting from 35.7 g. of N¹-[2-(3-isopropoxy-propylamino)-ethyl]-N⁴-acetyl-sulphanilamide (crude product) and 10.6 g. of cyanogen bromide, 4'-[2-imino-3-(3-isopropoxy-propyl)-imidazolidine-1-ylsulphonyl]-acetanilide, M.P. 224–226°, is obtained. 38.2 g. of the latter are hydrolysed analogous to Example 12(b) with 200 ml. of ethanolic hydrochloric acid to obtain 1-sulphanilyl-2-imino-3-(3-isopropoxy-propyl)-imidazolidine, M.P. 133–135°, as end product.

(b) The starting material for (a) is obtained analogously to Example 12(c) from 24.0 g. of 4'-(aziridin-1-ylsulphonyl)-acetanilide and 200 ml. of 3-isopropoxy-propylamine.

EXAMPLE 34

(a) Analogously to Example 12(a), starting from 37.1 g. of N¹-[2-(3-butoxy-propylamino)-ethyl]-N⁴-acetyl-sulphanilamide (crude product) and 10.6 g. of cyanogen bromide, 4'-[2-imino-3-(3-butoxy-propyl)-imidazolidin-1-ylsulphonyl]-acetanilide, M.P. 210–212°, is obtained. 39.6 g. of the latter are hydrolysed analogously to Example 12(b) with 200 ml. of 8 N ethanolic hydrochloric acid to obtain 1-sulphanilyl-2-imino-3-(3-butoxy-propyl)-imidazolidine, M.P. 126–128°, as end product.

(b) The starting material for (a) is obtained analogously to Example 12(c) from 24.0 g. of 4'-(aziridin-1-ylsulphonyl)-acetanilide and 200 ml. of 3-butoxy-propylamine.

EXAMPLE 35

(a) Analogously to Example 9(a), starting from 28.5 g. of N¹-(1-methyl-2-methylamino-ethyl)-N⁴-acetyl-sulphanilamide (crude product) and 10.6 g. of cyanogen bromide, 4'-(2-imino-3,5-dimethyl-imidazolidin - 1 - ylsulphonyl)-acetanilide, M.P. 258–260°, is obtained. 31.0 g. of the latter are hydrolysed analogously to Example 11(b) with 125 g. of 50% sulphuric acid to obtain 1-sulphanilyl-2-imino-3,5-dimethyl-imidazolidine, M.P. 196–197°, as end product.

(b) The starting material for (a) is obtained analogously to Example 9(c) from 25.4 g. of 4'-(2-methyl-aziridin-1-ylsulphonyl)-acetanilide [cf. Example 11(c)] and 200 ml. of 33% methylamine in ethanol.

EXAMPLE 36

(a) Analogously to Example 9(a), starting from 29.9 g. of N¹-(1-methyl-2-ethylamino-ethyl) - N⁴ - acetyl-sulphanilamide (crude product) and 10.6 of cyanogen bromide, 4' - (2-imino-3-ethyl-5-methyl-imidazolidin-1-ylsulphonyl)-acetanilide, M.P. 229–230°, is obtained. 32.4 g. of the latter are hydrolysed analogously to Example 11(b) with 125 g. of 50% sulphuric acid to obtain 1-sulphanilyl-2-imino-3-ethyl-5-methyl-imidazolidine, as end product.

(b) The starting material for (a) is obtained analogously to Example 9(c) from 25.4 g. of 4-(2-methylaziridin-1-ylsulphonyl)-acetanilide [cf. Example 11(c)] and 250 ml. of 20% ethylamine in benzene.

EXAMPLE 37

(a) Analogously to Example 9(a), starting from 31.3 g. of N¹-(1-methyl-2-propylamino-ethyl) - N⁴ - acetyl-sulphanilamide, M.P. 162–163°, and 10.6 g. of cyanogen bromide, 4'-(2-imino-3-propyl-5-methyl-imidazolidin-1-ylsulphonyl)-acetanilide, M.P. 254–255°, is obtained. 33.8 g. of the latter are hydrolysed analogously to Example 11(b) with 125 g. of 50% sulphuric acid to obtain 1-sulphanilyl-2-imino-3-propyl - 5 - methyl-imidazolidine, M.P. 146–148°, as end product.

(b) The starting material for (a) is obtained analogously to Example 9(c) from 25.4 g. of 4'-(2-methyl-aziridin-1-ylsulphonyl)-acetanilide (cf. Example 11(c)] and 100 ml. of propylamine.

EXAMPLE 38

(a) Analogously to Example 9(a), starting from 32.7 g. of N¹-(1-methyl-2-butylamino-ethyl) - N⁴ - acetyl-sulphanilamide, M.P. 166–167°, and 10.6 g. of cyanogen bromide, 4'-(2-imino-3-butyl-5-methyl-imidazolidin-1-ylsulphonyl)-acetanilide, M.P. 243–244°, is obtained. 35.2 g. of the latter are hydrolysed analogously to Example 11(b) with 125 g. of 50% sulphuric acid to obtain 1-sulphanilyl-2-imino-3-butyl - 5 - methyl - imidazolidine, M.P. 125–126°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of butylamine.

EXAMPLE 39

(a) Analogously to Example 9(a), starting from 32.7 g. of N¹-(1-methyl-2-sec. butylamino-ethyl)-N⁴-acetyl-sulphanilamide, M.P. 118–120°, and 10.6 g. of cyanogen bromide, 4'-(2-imino-3- sec. butyl-5-methyl-imidazolidin-1-ylsulphonyl)-acetanilide, M.P. 242–244°, is obtained. 35.2 g. of the latter are hydrolysed analogously to Example 11(b) with 125 g. of 50% sulphuric acid to obtain 1-sulphanilyl-2-imino-3-sec. butyl-5-methyl-imidazolidine, M.P. 194–195°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of sec. butylamine.

EXAMPLE 40

(a) Analogously to Example 9(a), starting from 34.1 g. of $N^1$-(1 - methyl - 2 - pentylamino-ethyl)-$N^4$--acetyl-sulphanilamide (crude product) and 10.6 g. of cyanogen bromide, 4'-(2-imino-3-penthyl-5-methyl-imidazolidin-1-ylsulphonyl)-acetanilide, M.P. 228–229°, is obtained. 36.4 g. of the latter are hydrolysed analogously to Example 11(b) with 125 g. of 50% sulphuric acid to obtain 1-sulphanilyl-2-imino-3-pentyl - 5 - methyl-imidazolidine, M.P. 127–128°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of pentylamine.

EXAMPLE 41

(a) Analogously to Example 9(a), starting from 38.3 g. of $N^1$-(1-methyl - 2 - octylamino-ethyl)-$N^4$-acetyl-sulphanilamide, M.P. 87°, and 10.6 g. of cyanogen bromide, 4'-(2-imino-3-octyl - 5 - methyl-imidazolidin-1-ylsulphonyl)-acetanilide, M.P. 215–216°, is obtained. 40.6 g. of the latter are hydrolysed analogously to Example 11(b) with 125 g. of 50% sulphuric acid to obtain 1-sulphanilyl-2-imino-3-octyl-5-methyl-imidazolidine, M.P. 108–109°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of octylamine.

EXAMPLE 42

(a) Analogously to Example 9(a), starting from 35.1 g. of $N^1$-(1-methyl-2-cyclohexylamino-ethyl)-$N^4$-acetyl-sulphanilamide (crude product) and 10.6 g. of cyanogen bromide, 4'-(2-imino-3-cyclohexyl-5-methyl-imidazolidin-1-ylsulphonyl)-acetanilide, M.P. 235–237°, is obtained. 37.6 g. of the latter are hydrolysed analogously to Example 11(b) with 125 g. of 50% sulphuric acid to obtain 1-sulphanilyl-2-imino - 3 - cyclohexyl-5-methyl-imidazoildine, M.P. 217–218°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of cyclohexylamine.

EXAMPLE 43

(a) Analogously to Example 9(a), starting from 34.9 g. of $N^1$-[1 - methyl-2-(3-cyclohexen-1-ylamino)-ethyl]-$N^4$-acetyl-sulphanilamide, M.P. 139–141°, and 10.6 g. of cyanogen bromide, 4'-[2-imino-3-(3-cyclohexen-1-yl)-5-methyl-imidazolidin - 1 - ylsulphonyl]-acetanilide, M.P. 208–209°, is obtained. 37.4 g. of the latter are hydrolysed analogously to Example 11(b) with 125 g. of 50% sulphuric acid to obtain 1-sulphanilyl-2-imino-3-(3-cyclohexen - 1 - yl) - imidazolidine, M.P. 208–209°, as end product.

(b) The starting material for (a) is obtained analogously to Example 9(c) from 25.4 g. of 4'-(2-methyl-aziridin-1-ylsulphonyl)-acetanilide [cf. Example 11(c)] and 100 ml. of (3-cyclohexen-1-yl)-amine.

EXAMPLE 44

(a) A solution of 11.9 g. of phenyl cyanate in 50 ml. of ether is added during 10 minutes with cooling at 10° to a solution of 25.5 g. of $N^1$-(2-cyclopropylamino-ethyl)-sulphanilamide in 100 ml. of dioxane. The resulting suspension is refluxed for 1½ hours and then concentrated under vacuum. The residue is treated with methylene chloride and 2 N sodium hydroxide solution. The insoluble crude product is separated by filtration; the organic phase of the filtrate is separated, dried over sodium sulphate and concentrated under vacuum. The residue is combined with the crude product obtained above and the mixture is recrystallised from methanol to yield 1-sulphanil-2-imino-3-cyclopropyl-imiazolidine melting at 202 204°.

The starting material is produced as follows:

(b) 7.1 g. of 1-sulphanilyl-aziridine, M.P. 124–126°, produced by catalytic reduction of 1-(p-nitro-phenylsulphonyl)-aziridine with Raney nickel in dioxane [cf. R. Lehmann et al., Bull. Soc. Chim. Belges, 55, 52 (1946)], is dissolved in 70 ml. of dioxane and this solution is added dropwise during one hour to 18.2 g. of boiling cyclopropylamine. The mixture is refluxed for another 2 hours. The excess cyclopropylamine is then removed by distillation and the reaction mixture is concentrated under vacuum. The residue is recrystallised from ethyl acetate to obtain $N^1$ - (2 - cyclopropylamino-ethyl)-sulphanilamide, M.P. 91–94°.

EXAMPLE 45

(a) Analogously to Example 44(a), starting from 27.1 g. of $N^1$-(2-butylamino-ethyl)-sulphanilamide, M.P. 76–78°, and a solution of 11.9 g. of phenyl cyanate in 50 ml. of ether, 1-sulphanilyl-2-imino-3-butylimidazolidine, M.P. 179–181°, is obtained.

The starting material is produced as follows:

(b) 31.3 g. of $N^1$-(2-butylamino-ethyl) - $N^4$ - acetyl-sulphanilamide are shaken with 300 ml. of ethanolic hydrochloric acid. First of all the crystals dissolve and then after an interval of several minutes, crystals again precipitate. The suspension is allowed to stand for 16 hours at room temperature and then concentrated under vacuum. The residue is dissolved in a little water, and carefully adjusted to a pH of 8 with 2 N sodium hydroxide solution, whereby the solution becomes milky turbid. The solution is extracted three times, using 200 ml. of chloroform each time. The chloroform solution is washed with a little water, dried with sodium sulphate and concentrated. The residue is recrystallised from ethyl acetate, to obtain $N^1$-(2-butylamino-ethyl)-sulphanilamide melting at 76–78°.

EXAMPLE 46

Analogously to Example 44(a), starting from 28.3 g. of $N^1$-(2-cyclopenylamino-ethyl)-sulphanilamide, the hydrochloride of which melts at 190–191°, and a solution of 11.9 g. of phenyl cyanate in 50 ml. of ether, 1-sulphanilyl-2-imino - 3 - cyclopentyl-imidazolidine, M.P. 192–193°, is obtained.

The starting material is produced analogously to Example 45(b) from 32.5 g. of $N^1$-(2-cyclopentylamino-ethyl)-$N^4$-acetyl-sulphanilamide [cf. Example 26(a)] and 300 ml. of ethanolic hydrochloric acid.

EXAMPLE 47

27.1 g. of $N^1$-(2-butylamino-ethyl)-sulphanilamide are dissolved in 120 ml. of 2 N sodium hydroxide; 10.6 g. of cyanogen bromide are added thereto. Crystals precipitate. The reaction mixture is stirred at room temperature for one hour and then the crystals are filtered. Recrystallisation of the crude product from methanol yields pure 1 - sulphanilyl-2-imino-3-butyl-imidazolidine, M.P. 179–181°.

EXAMPLE 48

Analogously to Example 47, starting from 120 ml. of 2 N sodium hydroxide solution, the following are obtained:

(a) With $N^1$ - (cyclopropylamino-ethyl) - sulphanilamide and 10.6 g. of cyanogen bromide, 1-sulphanilyl-2-imino-3-cyclopropylimidazolidine, M.P. 202–204°; and (b) With 28.3 g. of N¹-(cyclopentylamino-ethyl)-sulphanilamide and 6.2 g. of cyanogen chloride, 1-sulphanilyl-2-imino-3-cyclopentyl-imidazolidine, M.P. 192–193°.

EXAMPLE 49

A solution of 10.6 g. of cyanogen bromide in 50 ml. of absolute ether is added with stirring during 30 minutes at —10° to —5° to a solution of 14.6 g. of butylamine in 100 ml. of absolute ether. The reaction mixture is stirred 30 minutes longer and the precipitated butylamine-hydrobromide is then removed by filtration. While cooling is continued, a suspension of 2.8 g. of sodium hydride in 40 ml. of absolute ether is added to the filtrate, containing the resultant butyl-cyanamide dissolved therein. Cooling to the same temperature is continued while the suspension is stirred for another 30 minutes, and then 24.0 g. of 4'-(aziridin-1-ylsulphonyl)-acetanilide is added to the resulting, suspended sodium derivative of the butyl-cyanamide. The mixture is warmed to room temperature and stirred for 15 hours at this temperature. 2 N hydrochloric acid is then slowly added to the reaction mixture and the two phases which form are separated. The acidic aqueous phase is washed twice with ether, purified with active charcoal, filtered and rendered alkaline at 0° with concentrated sodium hydroxide solution. The 4'-(2-imino-3-butyl-imidazolidin - 1 - ylsulphonyl)-acetanilide which precipitates is filtered and recrystallised from methanol; it then melts at 243–244°.

The acetanilide which is obtained is hydrolysed analogously to Example 9(b) to 1-sulphanilyl-2-imino-3-imino-3-butyl-imidazolidine, M.P. 179–181°.

EXAMPLE 50

Analogously to Example 49, the following are obtained:

(a) From 6.2 g. of methylamine in 100 ml. of ether and 10.6 g. of cyanogen bromide, the N-methyl-cyanamide, which with 2.8 g. of sodium hydride in 40 ml. of ether is converted to the sodium derivative; this yields with 24.0 g. of 4'-(aziridin-1-ylsulphonyl)-acetanilide, 4'-(2-imino-3-methyl-imidazolidin - 1 - ylsulphonyl)-acetanilide, M.P. 266–267°, which analogously to Example 10(b) is hydrolysed to 1-sulphanilyl-2-imino-3-methyl-imidazolidine, M.P. 209–211°;

(b) From 9.0 g. of ethylamine in 100 ml. of ether and 10.6 g. of cyanogen bromide, the N-ethyl-cyanamide, which with 2.8 g. of sodium hydride in 40 ml. of ether is converted to the sodium derivative; this yields with 24.0 g. of 4'-(aziridin-1-ylsulphonyl)-acetanilide, 4'-(2-imino - 3 - ethyl-imidazolidin-1-ylsulphonyl)-acetanilide, M.P. 267–269°, which is hydrolysed according to Example 14 to 1-sulphanilyl-2-imino-3-ethyl-imidazolidine;

(c) From 11.8 g. of propylamine in 100 ml. of ether and 10.6 g. of cyanogen bromide, the propyl-cyanamide, which with 2.8 g. of sodium hydride in 40 ml. of ether is converted to the sodium derivative; this yields with 24.0 g. of 4'-(aziridin-1-yl-sulphonyl)-acetanilide, 4'-(2-imino-3-propyl - imidazolidin-1-ylsulphonyl) - acetanilide, M.P. 253–255°, which is hydrolysed according to Example 8 to 1-sulphanilyl-2-imino-3-propyl-imidazolidine, M.P. 164–166°;

(d) From 14.6 g. of tert. butylamine in 100 ml. of ether and 10.6 g. of cyanogen bromide, the tert. butyl-cyanamide, which with 2.8 g. of sodium hydride in 40 ml. of ether is converted to sodium derivative; this yields with 24.0 g. of 4'-(aziridin-1-ylsulphonyl)-acetanilide, 4'-(2-imino-3-tert. butyl-imidazolidin-1-ylsulphonyl)-acetanilide, M.P. 245–247°, which is hydrolysed according to Example 20 to 1-sulphanilyl-2-imino-3-tert. butyl-imidazolidine, M.P. 187–189°;

(e) From 17.0 g. of cyclopentylamine in 100 ml. of ether and 10.6 g. of cyanogen bromide, the cyclopentyl-cyanamide, which with 2.8 g. of sodium hydride in 40 ml. of ether is converted to the sodium derivative; this yields with 24.0 g. of 4'-aziridin-1-ylsulphonyl)-acetanilide, 4'-(2-imino-3-cyclopentyl-imidazolidin-1-ylsulphonyl) - acetanilide, M.P. 261–263°, which is hydrolysed according to Example 26 to 1-sulphanilyl-2-imino-3-cyclopentyl-imidazolidine, M.P. 192–193°; and (f) From 19.8 g. of cyclohexylamine in 100 ml. of ether and 10.6 g. of cyanogen bromide, the cyclohexyl-cyanamide, which with 2.8 g. of sodium hydride in 40 ml. of ether is converted to the sodium derivative; this yields with 24.0 g. of 4'-(aziridin-1-ylsulphonyl)-acetanilide, 4' - (2-imino - 3 - cyclohexyl-imidazolidin-1-ylsulphonyl)-acetanilide, M.P. 283–284°, which is hydrolysed according to Example 27 to 1-sulphanilyl-2-imino-3-cyclohexyl-imidazolidine, M.P. 178–179°.

EXAMPLE 51

While stirring and cooling to —5° to —10°, a solution of 14.6 g. of butylamine in 100 ml. of absolute ether is added dropwise to a solution of 10.6 g. of cyanogen bromide in 50 ml. of absolute ether. After several minutes the butylamine-hydrobromide precipitates. It is separated by filtration. 2.8 g. of sodium hydride in 40 ml. of absolute ether are added in portions to the filtrate, in which the butyl-cyanamide is dissolved. A precipitate forms. The suspension is diluted with 200 ml. of absolute ether and 200 ml. of dioxane, and then it is stirred for 10 minutes at room temperature. 19.8 g. of 1-sulphanilyl-aziridine are then added, the grey suspension is stirred for 15 more hours and then 30 ml. of 2 N hydrochloric acid are added. The organic phase is separated and extracted twice with 2 N hydrochloric acid. The aqueous acidic phases are combined, purified with active charcoal and filtered. The reaction mixture is neutralised with solid sodium hydrogen carbonate, whereby a brown resin precipitates. The resin is filtered over Celite (purified diatomaceous earth) and the clear colourless solution is rendered alkaline with concentrated sodium hydroxide solution. The reaction mixture is allowed to stand for one hour at 0°, the precipitated crystals are filtered and recrystallized from ethanol. 1-sulphanilyl-2-imino-3-butyl-imidazolidine, M.P. 179–181°, is obtained.

EXAMPLE 52

Analogously to Example 51, there are obtained:

(a) From 6.2 g. of methylamine in 100 ml. of ether and 10.6 g. of cyanogen bromide, the methyl-cyanamide, which with 2.8 g. of sodium hydride in 40 ml. of ether is converted to the sodium derivative; this with 19.8 g. of 1-sulphanilyl-aziridine yields 1-sulphanilyl-2-imino-3-methyl-imidazolidine, M.P. 209–211°;

(b) From 9.0 g. of ethylamine in 100 ml. of ether and 10.6 g. of cyanogen bromide, the ethyl-cyanamide, which with 2.8 g. of sodium hydride in 40 ml. of ether is converted to the sodium derivative; this with 19.8 g. of 1-sulphanilyl-aziridine yields 1-sulphanilyl-2-imino-3-ethyl-imidazolidine, M.P. 171–172°;

(c) From 11.8 g. of propylamine in 100 ml. of ether and 10.6 g. of cyanogen bromide, the propyl-cyanamide, which with 2.8 g. of sodium hydride in 40 ml. of ether is converted to the sodium derivative; this with 19.8 g. of 1-sulphanilyl-aziridine yields 1-sulphanilyl-2-imino-3-propyl-imidazolidine, M.P. 164–166°;

(d) From 14.6 g. of tert. butylamine in 100 ml. of ether and 10.6 g. of cyanogen bromide, the tert. butyl-cyanamide, which with 2.8 g. of sodium hydride in 40 ml. of ether is converted to the sodium derivative; this with 19.8 g. of 1-sulphanilyl-aziridine yields 1-sulphanilyl-2-imino-3-tert. butyl-imidazolidine, M.P. 187–189°;

(e) From 17.0 g. of cyclopentylamine in 100 ml. of ether and 10.6 g. of cyanogen bromide, the cyclopentyl-cyanamide, which 2.8 g. of sodium hydride in 40 ml. of ether is converted to the sodium derivative; this with 19.8 g. of 1-sulphanilyl-aziridine yields 1-sulphanilyl-2-imino-3-cyclopentyl-imidazolidine, M.P. 192–193°; and (f) From 19.8 g. of cyclohexylamine in 100 ml. of ether and 10.6 g. of cyanogen bromide, the cyclohexyl-cyanamide, which with 2.8 g. of sodium hydride in 40 ml. of ether is converted to the sodium derivative; this with 19.8 g. of 1-sulphanilyl-aziridine yields 1-sulphanilyl-2-imino-3-cyclohexyl-imidazolidine, M.P. 178–179°.

EXAMPLE 53

9.9 g. of 1-tert. butyl-aziridine [cf. A. Weissberger, Heterocyclic Compounds With Three and Four-Membered Rings, John Wiley & Sons Inc., London (1964), p. 530] are dissolved in 60 ml. of dioxane and treated with 10.6 g. of cyanogen bromide. In an exothermic reaction a solution of N-(2-bromo-ethyl)-N-tert. butyl-cyanamide is obtained, which is added dropwise with stirring to a solution of 21.4 g. of 4'-sulphamoyl-acetanilide in 100 ml. of 1 N sodium hydroxide solution. The reaction mixture is refluxed for one hour and then concentrated under vacuum to half its volume. The crystals which precipitate are filtered, washed with water, dried at 60° under vacuum and recrystallised from ethyl acetate. The resulting 4'-(2-imino-3-tert. butyl-imidazolidin-1-ylsulphonyl)-acetanilide melts at 245–247° and is hydrolysed according to Example 20 to yield 1-sulphanilyl 2-imino-3-tert. butyl-imidazolidine, M.P. 187–189°.

EXAMPLE 54

Analogously to Example 53, the following are obtained:

(a) From 5.7 g. of 1-methylaziridine and 10.6 g. of cyanogen bromide in 60 ml. of dioxane, N-(2-bromo-ethyl)-N-methyl-cyanamide, which with 21.4 g. of 4'-sulphamoyl-acetanilide in 100 ml. of 1 N sodium hydroxide solution yields 4'-(2-imino-3-methyl-imidazolidin-1-ylsulphonyl)-acetanilide, M.P. 266–267°; this is hydrolysed according to Example 10(b) to 1-sulphanilyl-2-imino-3-methyl-imidazolidine, M.P. 209–211°;

(b) From 7.1 g. of 1-ethyl-aziridine and 10.6 g. of cyanogen bromide in 60 ml. of dioxane, N-(2-bromo-ethyl) - N - ethyl-cyanamide, which with 21.4 g. of 4'-sulphamolyl-acetanilide in 100 ml. of 1 N sodium hydroxide solution yields 4'-(2-imino-3-ethyl-imidazolidin-1-ylsulphonyl)-acetanilide, M.P. 267–269°; this is hydrolysed according to Example 14 to 1-sulphanilyl-2-imino-3-ethyl-imidazolidine, M.P. 171–172°;

(c) From 8.5 g. of 1-propyl-aziridine and 10.6 g. of cyanogen bromide in 60 ml. of dioxane, N-(2-bromo-ethyl)-N-propyl-cyanamide, which with 21.4 g. of 4'-sulphamoyl-acetanilide in 100 ml. of 1 N sodium hydroxide solution yields 4'-(2-imino-3-propyl-imidazolidin-1-ylsulphonyl)-acetanilide, M.P. 253–255°; this is hydrolysed according to Example 16 to 1-sulphanilyl-2-imino-3-propyl-imidazolidine, M.P. 164–166°.

(d) From 8.5 g. of 1-isopropyl-aziridine and 10.6 g. of cyanogen bromide in 60 ml. of dioxane, N-(2-bromo-ethyl)-N-isopropyl-cyanamide, which with 21.4 g. of 4'-sulphamoyl-acetanilide in 100 ml. of 1 N sodium hydroxide solution yields 4'-(2-imino-3-isopropyl-imidazolidin-1-ylsulphonyl)-acetanilide, M.P. 253–254°; this is hydrolysed according to Example 17 to 1-sulphanilyl-2-imino-3-isopropyl-imidazolidine, M.P. 183–184°;

(e) From 9.9 g. of 1-isobutyl-aziridine and 10.6 g. of cyanogen bromide in 60 ml. of dioxane, N-(2-bromo-ethyl)-N-isobutyl-cyanamide, which with 21.4 g. of 4'-sulphamoyl-acetanilide in 100 ml. of 1 N sodium hydroxide solution yields 4'-(2-imino-3-isobutyl-imidazolidin-1-ylsulphonyl)-acetanilide, M.P. 264°–265°; this is hydrolysed according to Example 18 to 1-sulphanilyl-2-imino-3-isobutyl-imidazolidine, M.P. 146–147°;

(f) From 9.9 g. of 1-sec. butyl-aziridine and 10.6 g. of cyanogen bromide in 60 ml. of dioxane, N-(2-bromo-ethyl)-N-sec. butyl-cyanamide, which with 21.4 g. of 4'-sulphamoyl-acetanilide in 100 ml. of 1 N sodium hydroxide solution yields 4'-(2-imino-3-sec. butyl-imidazolidin-1-ylsulphonyl)-acetanilide, M.P. 265–266°; this is hydrolysed according to Example 19 to 1-sulphanilyl-2-imino-3-sec. butyl-imidazolidine, M.P. 173–173.5°;

(g) From 11.3 g. of 1-phenyl-aziridine and 10.6 g. of cyanogen bromide in 60 ml. of dioxane, N-(2-bromo-ethyl)-N-pentyl-cyanamide, which with 21.4 g. of 4'-sulphamoyl-acetanilide in 100 ml. of 1 N sodium hydroxide solution yields 4'-(2-imino-3-pentyl-imidazolidin-1-ylsulphonyl)-acetanilide, M.P. 248–250°; this is hydrolysed according to Example 21 to 1-sulphanilyl - 2-imino-3-pentyl-imidazolidine, M.P. 167–168°;

(h) From 12.7 g. of 1-hexyl-aziridine and 10.6 g. of cyanogen bromide in 60 ml. of dioxane, N-(2-bromo-ethyl)-N-hexyl-cyanamide, which with 21.4 g. of 4'-sulphamoyl-acetanilide in 100 ml. of 1 N sodium hydroxide solution yields 4'-(2-imino-3-hexyl-imidazolidin-1-ylsulphonyl)-acetanilide, M.P. 236–238°; this is hydrolysed according to Example 22 to 1-sulphanilyl-2-imino-3-hexyl-imidazolidine, M.P. 182–183°;

i) From 11.1 g. of 1-cyclopentyl-aziridine and 10.6 g. of cyanogen bromide in 60 ml. of dioxane, N-(2-bromo-ethyl)-N-cyclopentyl-cyanamide, which with 21.4 g. of 4'-sulphamoyl-acetanilide in 100 ml. of 1 N sodium hydroxide solution yields 4' - (2-imino - 3-cyclopentyl-imidazolidin-1-ylsulphonyl)-acetanilide, M.P. 261–263°; this is hydrolysed according to Example 26 to 1 - sulphanilyl-2 - imino-3 - cyclopentyl - imidazolidine, M.P. 192–193°; and (j) From 12.5 g. of 1-cyclohexyl-aziridine and 10.6 g. of cyanogen bromide in 60 ml. of dioxane, N-(2-bromo-ethyl)-N-cyclohexyl-cyanamide, which with 21.4 g. of 4'-sulphamoyl-acetanilide in 100 ml. of 1 N sodium hydroxide solution yields 4' - (2 - imino - 3 - cyclohexyl-imidazolidin-1-ylsulphonyl)-acetanilide, M.P. 283–284°; this is hydrolysed according to Example 27 to 1-sulphanilyl-2 - imino-3 - cyclohexyl - imidazolidine, M.P. 178°–179°.

EXAMPLE 55

14.7 g. of 1-phenethyl-aziridine are dissolved in 60 ml. of dioxane and treated with 10.6 g. of cyanogen bromide. In an exothermic reaction N-(2-bromo-ethyl)-N-phenethyl-cyanamide is formed, which in the reaction solution is added with stirring to a solution of 17.2 g. of sulphanilamide in 100 ml. of 1 N sodium hydroxide solution. The reaction mixture is refluxed for one hour and then concentrated under vacuum. Water is added to the residue, and the resulting precipitate is filtered and recrystallised from ethyl acetate. The resulting 1-sulphanilyl-2-imino-3-phenethyl-imidazolidine melts at 123–124°.

EXAMPLE 56

Analogously to Example 55, the following are obtained:

(a) From 5.7 g. of 1-methyl-aziridine and 10.6 g. of cyanogen bromide in 60 ml. of dioxane, N-(2-bromo-ethyl) - N - methyl-cyanamide, which with 17.2 g. of sulphanilamide in 100 ml. of 1 N sodium hydroxide solution yields 1-sulphanilyl-2-imino-3-methyl-imidazolidine, M.P. 209–211°.

(b) From 7.1 g. of 1-ethyl-aziridine and 10.6 g. of cyanogen bromide in 60 ml. of dioxane, N-(2-bromo-ethyl) - N-ethyl-cyanamide, which with 17.2 g. of sulphanilamide in 100 ml. of 1 N sodium hydroxide solution yields 1-sulphanilyl-2-imino-3-ethyl - imidazolidine, M.P. 171–172°;

(c) From 8.5 g. of 1-propyl-aziridine and 10.6 g. of cyanogen bromide in 60 ml. of dioxane, N-(2-bromo-ethyl) - N - propyl-cyanamide, which with 17.2 g. of sulphanilamide in 100 ml. of 1 N sodium hydroxide solution yields 1-sulphanilyl-2-imino-3-propyl - imidazolidine, M.P. 164–166°;

(d) From 8.5 g. of 1-isopropyl-aziridine and 10.6 g. of cyanogen bromide in 60 ml. of dioxane, N-(2-bromo-ethyl) - N-isopropyl-cyanamide, which with 17.2 g. of sulphanilamide in 100 ml. of 1 N sodium hydroxide solution yields 1-sulphanilyl-2-imino - 3 - isopropyl-imidazolidine, M.P. 183–184°;

(e) From 9.9 g. of 1-butyl-aziridine and 10.6 g. of cyanogen bromide in 60 ml. of dioxane, N-(2-bromo-ethyl)-N-butyl-cyanamide, which with 17.2 g. of sulphanilamide in 100 ml. of 1 N sodium hydroxide solution yields 1-sulphanilyl-2-imino-3-butyl - imidazolidine, M.P. 179–181°;

(f) From 9.9 g. of 1-isobutyl-aziridine and 10.6 g. of cyanogen bromide in 60 ml. of dioxane, N-(2-bromo-ethyl) - N-isobutyl-cyanamide, which with 17.2 g. of sulphanilamide in 100 ml. of 1 N sodium hydroxide solution yields 1-sulphanilyl-2-imino-3-isobutyl-imidazolidine, M.P. 146–147°;

(g) From 9.9 g. of 1-sec. butyl-aziridine and 10.6 g. of cyanogen bromide in 60 ml. of dioxane, N-(2-bromo-ethyl)-N-sec. butyl-cyanamide, which with 17.2 g. of sulphanilamide in 100 ml. of 1 N sodium hydroxide solution yields 1-sulphanilyl-2-imino-3-sec. butyl-imidazolidine, M.P. 173–173.5°;

(h) From 11.3 g. of 1-phenyl-aziridine and 10.6 g. of cyanogen bromide in 60 ml. of dioxane, N-(2-bromo-ethyl) - N - pentyl-cyanamide, which with 17.2 g. of sulphanilamide in 100 ml. of 1 N sodium hydroxide solution yields 1-sulphanilyl-2-imino-3-pentyl-imidazolidine, M.P. 167–168°;

(i) From 12.7 g. of 1-hexyl-aziridine and 10.6 g. of cyanogen bromide in 60 ml. of dioxane, N-(2-bromo-ethyl)-N-hexyl-cyanamide, which with 17.2 g. of sulphanilamide in 100 ml. of 1 N sodium hydroxide solution yields 1 - sulphanilyl-2-imino-3-hexyl-imidazolidine, M.P. 182–183°;

(j) From 11.1 g. of cyclopentyl-aziridine and 10.6 g. of cyanogen bromide in 60 ml. of dioxane, N-(2-bromo-ethyl)-N-cyclopentyl-cyanamide, which with 17.2 g. of sulphanilamide in 100 ml. of 1 N sodium hydroxide solution yields 1-sulphanilyl-2-imino-3-cyclopentyl-imidazolidine, M.P. 192–193°; and (k) From 12.5 g. of 1-cyclohexyl-aziridine and 10.6 g. of cyanogen bromide in 60 ml. of dioxane. N-(2-bromo-ethyl)-N-cyclohexyl-cyanamide, which with 17.2 g. of sulphanilamide in 100 ml. of 1 N sodium hydroxide solution yields 1 - sulphanilyl - 2 - imino-3-cyclohexyl-imidazolidine, M.P. 178–179°.

EXAMPLE 57

A mixture of 16.0 g. of N-(2-chloro-ethyl)-N-tert. butyl-cyanamide, 5.6 g. of potassium hydroxide and 17.2 g. of sulphanilamide in 100 ml. of diethylene glycol ether are heated for 30 minutes in a bath having a temperature of 160–170°. The reaction mixture is then poured on to ice and the suspension is filtered. The filter residue is dissolved in 2 N hydrochloric acid, the colour of the solution is removed by active charcoal, the solution is filtered and rendered alkaline with concentrated sodium hydroxide solution. The crystals which precipitate are separated by filtration, washed with water and recrystallised from ethanol. 1-sulphanilyl-2-imino-3-tert. butyl-imidazolidine, M.P. 188–190°, is obtained.

EXAMPLE 58

(a) 34.6 g. of $N^1$-(2-bromo-ethyl)-$N^1$-cyano-$N^4$-acetyl-sulphanilamide are dissolved in 500 ml. of ethanol and 7.3 g. of butylamine, and refluxed for 17 hours. The reaction mixture is concentrated and the residue is taken up in chloroform and 2 N hydrochloric acid. The acidic aqueous extract is rendered alkaline with concentrated sodium hydroxide solution. The crude product precipitates; it is separated by filtration and purified by recrystallisation from ethanol and acetone. The resulting 4'-(2-imino-3-butyl-imidazolidin-1-ylsulphonyl) - acetanilide melts at 249–251°. This acetanilide is hydrolysed according to Example 9(b) to 1-sulphanilyl-2-imino-3-butyl-imidazolidine, M.P. 179–181°.

(b) The sulphanilamide used as starting material can be produced as follows:

During 30 minutes a solution of 4.3 g. of aziridine in 20 ml. of ether is added dropwise at 0° to a solution of 10.6 g. of cyanogen bromide in 30 ml. of ether. The resulting suspension is concentrated under vacuum at a bath temperature below 40°. The residue is slurried in 60 ml. of water, and a solution of 25 g. of $N^4$-acetyl-sulphanilyl chloride in 190 ml. of acetone is added to the resulting suspension. 4.5 g. of sodium hydroxide in 10 ml. of water are then added dropwise thereto during 10 minutes and the resulting mixture is refluxed for 30 minutes. After cooling, the crude product crystallises. It is separated by filtraation. Another yield of the crude product is obtained when the filtrate is diluted with water; it is separated and combined with the first fraction. The two fractions are recrystallised from methanol to yield $N^1$-(2-bromo-ethyl)-$N^1$-cyano-$N^4$-acetyl-sulphanilamide melting at 177–179°.

EXAMPLE 59

Analogously to Example 58, starting from 34.6 g. of $N^1$ - (2-bromo-ethyl)-$N^1$-cyano-$N^4$-acetyl-sulphanilamide in 500 ml. of ethanol, the following are obtained:

(a) With 31.0 g. of methylamine, 4'-(2-imino-3-methyl-imidazolidin-1-ylsulphonyl) - acetanilide, M.P. 266–267°, which is hydrolysed according to Example 10(b) to 1-sulphanilyl-2-imino-3-methyl-imidazolidine, M.P. 209–211;

(b) With 45.0 g. of ethylamine, 4'-(2-imino-3-ethyl-imidazolidin-1-ylsulphonyl)-acetanilide, M.P. 267–269°, which is hydrolysed according to Example 14 to 1-sulphanilyl-2-imino-3-ethyl-imidazolidine, M.P. 171–172°;

(c) With 59.0 g. of propylamine, 4'-(2-imino-3-propyl-imidazolidin-1-ylsulphonyl)-acetanilide, M.P. 253–255°, which is hydrolysed according to Example 16 to 1-sulphanilyl-2 - imino - 3 - propyl - imidazolidine, M.P. 164–166°;

(d) With 59.0 g. of isopropylamine, 4'-(2-imino-3-isopropyl-imidazolidin-1-ylsulphonyl)-acetanilide, M.P. 253–254°, which is hydrolysed according to Example 17 to 1-sulphanilyl-2-imino-3-isopropyl-imidazolidine, M.P. 183–184°;

(e) With 73.0 g. of isobutylamine, 4'-(2-imino-3-isobutylimidazolidin-1-ylsulphonyl)-acetanilide, M.P. 264–265°, which is hydrolysed according to Example 18 to 1-sulphanilyl-2-imino-3-isobutyl-imidazolidine, M.P. 146–147°;

(f) With 73.0 g. of sec. butylamine, 4'-(2-imino-3-sec. butyl-imidazolidin-1-ylsulphonyl)-acetanilide, M.P. 265–266°, which is hydrolysed according to Example 19 to 1-sulphanilyl-2-imino-3-sec. butyl-imidazolidine, M.P. 173–173.5°;

(g) With 73.0 g. of tert. butylamine, 4'-(2-imino-3-tert. butyl-imidazolidin-1-ylsulphonyl)-acetanilide, M.P. 245–247°, which is hydrolysed according to Example 20 to 1-sulphanilyl-2-imino-3-tert. butyl-imidazolidine, M.P. 187–189°;

(h) With 87.0 g. of pentylamine, 4'-(2-imino-3-pentyl-imidazolidin-1-ylsulphonyl)-acetanilide, M.P. 248–250°, which is hydrolysed according to Example 21 to 1-sulphanilyl-2-imino-3-pentyl-imidazolidine, M.P. 167–168°;

(i) With 85.0 g. of cyclopentylamine, 4'-(2-imino-3-cyclopentyl-imidazolidin-1-ylsulphonyl)-acetanilide, M.P. 261–263°, which is hydrolysed according to Example 26 to 1-sulphanilyl-2-imino-3-cyclopentyl-imidazolidine, M.P. 192–193°;

(j) With 99.0 g. of cyclohexylamine, 4'-(2-imino-3-cyclohexyl-imidazolidin-1-ylsulphonyl) - acetanilide, M.P. 283–284°, which is hydrolysed according to Example 27 to 1-sulphanilyl-2-imino-3-cyclohexyl-imidazolidine, M.P. 178–179°.

EXAMPLE 60

(a) A solution of 35.0 g. of $N^1$-(2-bromo-ethyl)-$N^1$-cyano-$N^4$-acetyl-sulphanilamide and 10.0 g. of 3-methoxypropylamine in 250 ml. of butanol is refluxed for 1½ hours. The mixture is then poured into a liter of ice water and extracted with methylene chloride. The aqueous phase is separated and he organic phase is extracted with 2 N hydrochloric acid. The acidic aqueous extract is rendered alkaline with concentrated sodium hydroxide solution. The crude product precipitates. It is filtered and recrystallised from acetone/ethanol, yielding 4'-[2-imino-3-(3-methoxy-propyl)-imidazolidin-1 - ylsulphonyl] - acetanilide, M.P. 233–235°.

(b) 35.4 g. of the acetanilide obtained according to (a) are dissolved in 150 ml. of 2 N hydrochloric acid and the solution is heated for one hour in a bath having a temperautre of 78–80°. The solution is then cooled and rendered alkaline with concentrated sodium hydroxide solution. The crude product precipitates. It is filtered and recrystallised from ethanol. The resulting 1-sulphanilyl-2-imino-3-(3-methoxy-propyl)-imidazolidine melts at 132–134°.

EXAMPLE 61

(a) 38.9 g. of $N^1$-[2-N-isopropyl-benzylamino)-ethyl]-$N^4$-acetyl-sulphanilamide are dissolved in 500 ml. of benzene. 10.6 g. of cyanogen bromide are added to the solution, the reaction mixture is stirred for 3 hours at room temperature and then concentrated. The residue is rendered alkaline with 2 N sodium hydroxide solution. Crystals precipitate which are washed with water and recrystallised from methanol/ether. The resulting, pure 4'-(2-imino - 3 - isopropyl - imidazolidin - 1-ylsulphonyl)-acetanilide melts at 253°. The acetanilide obtained is hydrolyzed according to Example 17 to 1-sulphanilyl-2-imino-3-isopropyl-imidazolidine, M.P. 183–184°.

The starting material is produced as follows:

(b) 24.0 g. of 4'-aziridin-1-ylsulphonyl)-acetanilide are dissolved in 100 ml. of dioxane and 20 ml. of water, and, while stirring, are refluxed for 5 hours with 15.0 g. of N-benzyl-isopropylamine. The reaction mixture is then concentrated. The resulting oil crystallises in ethyl acetate. Recrystallised from ethyl acetate, the pure $N^1$-[2-(N-isopropyl-benzylamino)-ethyl]-$N^4$ - acetyl - sulphanilamide melts at 85–86°.

EXAMPLE 62

(a) 37.45 g. of addition salt of $N^1$-cyano-$N^4$-acetyl-sulphanilamide and N-(2-chloro-ethyl)-tert. butylamine are heated for one hour in a bath having a temperature of 145°, whereby the salt melts. The reaction mixture is cooled, the resinous substance is triturated with 2 N hydrochloric acid, and the insoluble resin is separated from the solution by decantation. The solution is rendered alkaline with concentrated sodium hydroxide solution, the crude product which precipitates is separated by filtration, washed with water and recrystallised from ethanol. 4'-(2-imino-3-tert. butyl - imidazolidin - 1 - ylsulphonyl)-acetanilide, M.P. 242–244°, is obtained, which is hydrolysed according to Example 20 to 1-sulphanilyl-2-imino-3-tert. butyl-imidadozidine, M.P. 187–189°.

The starting material is obtained as follows:

(b) To a solution of 8.6 g. of disodium cyanamide in 100 ml. of water, there are added during 30 minutes in portions, 23.3 g. of N-acetylsulphanilyl chloride, which gradually dissolves in a slightly exothermic reaction. The solution is stirred for one hour at room temperature, whereby the sodium derivative of $N^1$-cyano-$N^4$-acetyl-sulphanilamide is formed. Then during 15 minutes, 17.2 g. of N-(2-chloro-ethyl)-tert. butylamine-hydrochloride are added in portions to the reaction mixture. After an interval of a few minutes, the addition salt of $N^1$-cyano-$N^4$-acetyl-sulphanilamide and N-(2-chloro-ethyl)-tert. butylamine precipitates. The salt is filtered, washed with water and recrystallised from isopropanol; it then melts at 122–124°.

EXAMPLE 63

(a) 15.5 g. of 1-butyl-2-imino-hexahydropyrimidine are dissolved in a solution of 4.8 g. of sodium hydroxide in 100 ml. of water. A solution of 25 g. of N-acetyl-sulphanilyl chloride in 100 ml. of acetone is added thereto. An exothermic reaction takes place and crystals precipitate, The mixture is heated for 15 minutes longer in a water bath and then cooled to 0°. The precipitated crystals are separated by filtration and recrystallised from ethanol. 4'-(2-imino-3-butyl - hexylhydropyrimidin-2-yl-sulphonyl)-acetanilide, M.P. 189–191°, is obtained.

(b) 35.2 g. of the acetanilide obtained according to (a) are dissolved in 180 ml. of 8 N ethanol hydrochloric acid, and this solution is allowed to stand for 2 days at room temperature. The reaction mixture is concentrated and the residue is dissolved in water. The solution is separated by filtration and rendered alkaline with sodium hydroxide solution. The crystals which precicitate are separated by filtration, washed with water and recrystallised from acetone/methanol, to yield 1-sulphanilyl-2-imino-3-butyl-hexahydropyrimidine melting at 180–183°.

EXAMPLE 64

The following are produced analogously to Example 63(a):

(a) From 23.4 g. of 1-octyl-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-(2-imino-3-octyl-imidazolidin-1-ylsulphonyl) - acetanilide, M.P. 229–230°, which is hydrolysed analogously to Example 63(b) to 1-sulphanilyl-2-imino-3-octyl-imidazolidine, M.P. 143–144°;

(b) From 26.2 g. of 1-decyl-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-(2-imino-3-decyl-imidazolidin - 1 - ylsulphonyl) - acetanilide, M.P. 216–217°, which is hydrolysed analogously to Example 63(b) to 1-sulphanilyl-2-imino-3-decyl-imidazolidine, M.P. 119–120°;

(c) from 29.0 g. of 1-dodecyl-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-(2-imino-3-dodecyl - imidazolidin-1-ylsulphonyl)-acetanilide, M.P. 218–219°, which is hydrolysed analogously to Example 63(b) to 1-sulphanilyl-2-imino-3-dodecyl-imidazolidine, M.P. 110–111°;

(d) From 22.6 g. of 1-phenethyl-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-(2-imino-3-phenethyl - imidazolidin-1-ylsulphonyl)-acetanilide (crude product), which is hydrolysed analogously to Example 63(b) to 1-sulphanilyl-2-imino-3-phenethyl-imidazolidine, M.P. 123–124°;

(e) From 21.2 g. of 1-benzyl-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-(2-imino-3-benzyl - imidazolidin-1-ylsulphonyl) - acetanilide, M.P. 268–269°, which is hydrolysed analogously to Example 63(b) to 1-sulphanilyl-2-imino-3-benzyl-imidazolidine. M.P. 170–171°; and (f) From 25.6 g. of 1-(1-adamantyl)-2-amino-2-imidazoline hydrochloride and 12.0 g. of sodium hydroxide in 120 ml. of water with 15.0 g. of N-acetyl-sulphanilyl chloride, which has been dissolved in 150 ml. of warm acetone, 4'-[2-imino-3-(1-adamantyl) - imidazolidin-1-ylsulphonyl]-acetanilide, M.P. 273–275°, which is hydrolysed analogously to Example 63(b) to 1-sulphanilyl-2-imino-3-(1-adamantyl)-imidazolidine, M.P. 240–243°.

EXAMPLE 65

13.2 g. of cyanogen bromide in 220 ml. of ether are added to 31.0 g. of crude N-tert. butyl-1,2-propanediamine-dihydrobromide. During 5 minutes, a solution of 11.4 g. of sodium carbonate in 88 ml. of water is added in portions to the resulting mixture. The suspension obtained is stirred for 15 hours at room temperature and allowed to stand for 2 days. The aqueous layer, containing 1-tert. butyl-2-amino-4-methyl-2-imidazoline, is separated from the ether solution and the aqueous phase is diluted with water to dissolve the precipitated sodium bromide. To the aqueous solution, a solution of 23.8 g. of N-acetyl-sulphanilyl chloride in 220 ml. of acetone is added and also a solution of 8.8 g. of sodium hydroxide in 44 ml. of water. The mixture is then refluxed for 30 minutes, cooled; the crude product which precipitates is separated by filtration and recrystallised from chloroform/ ethanol. 4'-(2-imino-3-tert. butyl-5-methyl-imidazolidin-1-ylsulphonyl)-actanilide, M.P. 238–240, is obtained.

(b) The acetanilide obtained according to (a) is hydrolysed analogously to Example 63(b) to 1-sulphanilyl-2-imino-3-tert. butyl-5-methyl-imidazolidine, M.P. 145–146°.

The starting product for (a) can be produced as follows:

(c) 16.35 g. of N-tert. butyl-2-chloro-propionamide [cf. J. Am. Chem. Soc., 78, 6124 (1956)] and 25.0 g. of benzylamine are heated at a bath temperature of 150–170° for 3½ hours. From the solution which is originally homogeneous, crystals precipitate. The reaction mixture is cooled and 150 ml. of 2 N sodium hydroxide solution and chloroform are added thereto. The organic phase is separated, washed with water, dried and concentrated. The residue is distilled. After a first running of benzylamine, N-tert. butyl-(2-benzylamine)-propionamide, B.P. 123–125°/0.03 torr, is obtained. The hydrochloride melts at 158–162°.

(d) A solution of 23.4 g. of the amide obtained according to (c) in 80 ml. of absolute tetrahydrofuran is added dropwise during 15 minutes to a suspension of 9.0 g. of lithium aluminium hydride in 200 ml. of absolute tetrahydrofuran. The suspension is then refluxed for 38 hours. The colour changes to raspberry red and during a period of 30 minutes back to grey again. The reaction mixture is cooled, the excess lithium aluminium hydride is decomposed, while cooling, with ethyl acetate, then with water and with methanol and the suspension is concentrated. The grey residue is extracted twice with boiling chloroform during 30 minutes and filtered. The combined chloroform solutions are dried over sodium sulphate and concentrated. The residual oil is distilled. N-tert. butyl-N-benzyl-1,2-propane-diamine distills at 72–86°/0.005 torr.

(e) 34.0 g. of 48% pure hydrogen bromide and 8.8 g. of 5% palladium charcoal are added to 22.0 g. of the amine obtained according to (d) in 440 ml. of distilled ethanol. The mixture is hydrogenated at room temperature and normal pressure. After 95% of the calculated amount of hydrogen has been taken up, 8.8 g. of 5% palladium charcoal are added and hydrogenation is continued. After 17 hours, the reaction mixture has taken up 98% of the calculated amount of hydrogen. The catalyst is removed by filtration, rinsed with ethanol, and the filtrate is concentrated. The residue, N-tert. butyl-1,2-propanediamine dihydrobromide, is used as crude product.

EXAMPLE 66

(a) Analogously to Example 65(a–b), the following end product is obtained:

From N-butyl-1,2-propanediamine and cyanogen bromide, 1 - butyl-2-amino-4-methyl-2-imidazoline hydrobromide (crude product), which with N-acetyl-sulphanilyl chloride yields 4'-(2-imino-3-butyl-5-methyl-imidazolidin-1-ylsulphonyl)-acetanilide, M.P. 243–244°, the hydrolysis of which yields 1-sulphanilyl-2-amino - 2 - butyl - 5-methyl-imidazolidine, M.P. 125–126°.

The starting material is obtained as follows:

(b) While cooling well with ice, 12.7 g. of 2-chloropropionyl chloride in 20 ml. of chloroform are added dropwise during 30 minutes to a solution of 16.1 g. of butylamine in 50 ml. of chloroform. The resulting solution is allowed to stand for 15 hours at room temperature, then washed several times with water, and the organic phase is separated. The organic phase is dried over sodium sulphate and concentrated. Crude N-butyl-2-chloro-propionamide remains as residue.

(c) Analogously to Example 65(c–e), starting from the crude amide from (b) via the intermediate products N-butyl-2-benzenylamino - propionamide, B.P. 151–154°/0.0005 torr and N-butyl-N'-benzyl-1,2-propanediamine, B.P. 98–104°/0.04 torr, N-butyl-1,2-propanediamine is obtained.

EXAMPLE 67

(a) Analogously to Example 65(a–b), the following end product is obtained:

From N-butyl-1,2-butanediamine (crude product) and cyanogen bromide, 1-butyl-2-amino-4-ethyl-2-imidazolidine-dihydrobromide (crude product), which with N-acetyl-sulphanilyl chloride yields 4'-(2-imino-3-butyl-5-ethyl-imidizolidin-1-ylsulphonyl)-acetanilide (crude product), M.P. 107–111°, which is hydrolysed to 1-sulphanilyl-2-imino-3-butyl-5-ethyl-imidazolidine, M.P. 161–163°.

The starting material for (a) is produced as follows:

(b) Analogously to Examples 66(b) and 65(c–e), starting from 2-chloro-butyryl chloride via the intermediate products N-butyl - 2 - chlorobutyramide (crude product) N-butyl-2-benzylamino-butyramide (crude product) and N - butyl-N-benzyl-1,2-butanediamine (crude product), N-butyl-1,2-butanediamine is obtained.

EXAMPLE 68

Analogously to Example 63(a) the following end products are obtained:

(a) From 24.0 g. of 1-(2-methylthio-ethyl)-2-amino-2-imidazoline hydrobromide (M.P. 138–140°) and 12.0 g. of sodium hydroxide in 120 ml. of water with 23.3 g. of N-acetyl-sulphanilyl chloride, which has been dissolved in 150 ml. of warm acetone, 4'-[2-imino-3-(2-methylthioethyl)-imidazolidin-1-ylsulphonyl]-acetanilide, M.P. 257–259°, which is hydrolysed analogously to Example 63(b) to 1-sulphanilyl-2-imino-3-(2-methylthio - ethyl) - imidazolidine, M.P. 152–153°.

The starting material is produced analogously to Example 65(a) from 13.4 g. of N-(2-amino-ethyl)-2-methylthio-ethylamine and 10.6 g. of cyanogen bromide;

(b) From 22.4 g. of 1-(2-methoxy-ethyl)-2-amino-2-imidazoline hydrobromide (M.P. 141–144°) and 12.0 g. of sodium hydroxide in 120 ml. of water with 23.3 g. of N-acetyl-sulphanilyl chloride, which has been dissolved in 150 ml. of warm acetone 4'-[2-imino-3-(2-methoxyethyl)-imidazolidin - 1 - ylsulphonyl] - acetanilide, M.P. 230–232°, which is hydrolysed analogously to Example 63(b) to 1-sulphanilyl - 2 - imino - 3-(2 - methoxy-ethyl)-imidazolidine, M.P. 230–232°.

The starting material is produced analogously to Example 65(a) from 23.8 g. of N - (2-amino-ethyl) - 3-methoxy-ethylamine and 10.6 g. of cyanogen bromide;

(c) From 23.8 g. of 1-(3-methoxy-propyl)-2-amino-2-imidazoline hydrobromide (crude product) and 12.0 g. of sodium hydroxde in 120 ml. of water with 23.3 g. of N-acetyl-sulphanilyl chloride, which has been dissolved in 150 ml. of warm acetone, 4'-[2-imino-3-(3-ethoxypropyl) - imidazolidin - 1 - ylsulphonyl] - acetanilide, M.P. 230–232°, which is hydrolysed analogously to Example 63(b) to 1-sulphanilyl-2-imino-3-(3 - methoxy - propyl)-imidazolidine, M.P. 132–134°.

The starting material is produced analogously to Example 65(a) from 23.8 g. of N - (2 - amino - ethyl) - 3-methoxy-propylamine and 10.6 g. of cyanogen bromide;

(d) From 25.2 g. of 1-(3-ethoxy-propyl)-2-amino-2-imidazoline hydrobromide (crude product) and 12.0 g. of sodium hydroxide in 120 ml. of water with 23.3 g. of N-acetyl-sulphanilyl chloride, which has been dissolved in 150 ml. of warm acetone, 4' - [2 - imino - 3 - (3 - ethoxypropyl) - imidazolidin - 1 - ylsulphonyl]acetanilide, M.P. 220–223°, which is hydrolysed analogously to Example 63(b) to 1 - sulphanilyl - 2 - imino-3-(3-ethoxy-propyl)-imidazolidine, M.P. 148–150°.

The starting material is produced analogously to Example 65(a) from 14.6 g. of N-(2-amino-ethyl)-3-ethoxy-propylamine and 10.6 g. of cyanogen bromide;

(e) From 26.6 g. of 1-(3-isopropoxy-propyl)-2-amino-2-imidazoline hydrobromide (crude product) and 12.0 g. of sodium hydroxide in 120 ml. of water with 23.3 g. of N-acetyl-sulphanilyl chloride, which has been dissolved in 150 ml. of warm acetone, 4'-[2-imino-3-(3-isopropoxy-propyl)-imidazolidin - 1 - ylsulphonyl]-acetanilide, M.P. 224–226°, which is hydrolysed analogously to Example 63(b) to 1-sulphanilyl-2-imino-3-(3-isopropoxy-propyl)-imidazolidine, M.P. 133–135°.

The starting material is produced analogously to Example 65(a) from 16.0 g. of N-(2-amino-ethyl)-3-isopropoxy-propylamine and 10.6 g. of cyanogen bromide; and (f) From 28.0 g. of 1-(3-butoxy-propyl)-2-amino-2-imidazoline hydrobromide (crude product) and 12.0 g. of sodium hydroxide in 120 ml. of water with 23.3 g. of N-acetyl-sulphanilyl chloride, which has been dissolved in 150 ml. of warm acetone, 4'-[2-imino-3-(3-butoxy-propyl)-imidazolidin - 1 - ylsulphonyl]-acetanilide, M.P. 210–212°, which is hydrolysed analogously to Example 63(b) to 1-sulphanilyl - 2 - imino-3-(3-butoxy-propyl)-imidazolidine, M.P. 126–128°.

The starting material is produced analogously to Example 65(a) from 17.4 g. of N-(2-amino-ethyl)-3-butoxy-propylamine and 10.6 g. of cyanogen bromide.

EXAMPLE 69

(a) Analogously to Example 9(a), starting from 30.1 g. of N - (2 - cyclohexylamino-ethyl)-p-nitro-benzene-sulphonamide (crude product) and 10.6 g. of cyanogen bromide in 100 ml. of 2 N sodium hydroxide solution, 1-(p-nitro-phenylsulphonyl) - 2 - imino-3-cyclohexyl-imidazolidine, M.P. 98–99° (from benzene) is obtained.

(b) 35.2 g. of the nitro compound produced according to (a) are dissolved in one liter of ethanol, and, in the presence of palladium-charcoal (50% palladium), then hydrogenated at 20° and normal pressure until cessation of the reaction. The catalyst is then removed by filtration, rinsed with ethanol, and the filtrate is concentrated under vacuum. Recrystallisation of the residue from dioxane/water yields pure 1-sulphanilyl-2-imino-3-cyclohexyl-imidazolidine, M.P. 181–183°.

(c) The starting material used for (a) is obtained analogously to Example 9(c) from 22.8 g. of 1-(p-nitro-phenylsulphonyl)-aziridine and 150 ml. of cyclohexylamine.

EXAMPLE 70

(a) 25.6 g. of N-(2-propylamino-ethyl)-p-toluenesulphonamide are dissolved in 100 ml. of 2 N sodium hydroxide solution and, while cooling at 20–30°, 10.6 g. of cyanogen bromide are added. The reaction mixture is allowed to stand for 10 minutes and the crystals which have precipitated are then filtered. The crude product is recrystallised from ethyl acetate to yield 1-(p-tolyl-sulphonyl) - 2 - imino - 3 - propyl-imidazolidine melting at 95–96°.

The starting material is produced as follows:

(b) A solution of 190.5 g. of p-toluenesulphonyl chloride and 250 ml. of acetone is added dropwise during 20 minutes with stirring to a solution of 43.0 g. of aziridine in 300 ml. of 4 N sodium hydroxide solution which has been cooled to —10°. The reaction mixture is stirred for 2 hours at 0–10° with cooling. 2 liters of water are then added to the mixture and it is extracted three times with 500 ml. of ether. The ether extract is dried over sodium sulphate and concentrated under vacuum. The residue, crude 1-(p-tolylsulphonyl)-aziridine, melts at 54–56°.

(c) A solution of 19.7 g. of 1-(p-toylsulphonyl)-aziridine in 100 ml. of dioxane and 15 ml. of water is added dropwise at room temperature to 100 ml. of propylamine, and the reaction mixture is refluxed for one hour. It is then concentrated under vacuum. Recrystallisation of the residue from ethyl acetate/petroleum ether yields pure N-(2-propylamino-ethyl) - p-toluene-sulphonamide, M.P. 39–41°.

EXAMPLE 71

Analogously to Example 70(a), starting from 10.6 g. of cyanogen bromide, the following end products are obtained:

(a) With 27.0 g. of N-(2-tert. butylamino-ethyl)-p-toluene-sulphonamide, M.P. 67–68° (from ethyl acetate/ether), 1 - (p-tolylsulphonyl)-2-imino-3-tert. butyl-imidazolidine, M.P. 130–131° [the starting product is produced analogously to Example 70(c) from 19.7 g. of 1-(p-tolylsulphonyl)-aziridine and 100 ml. of tert. butylamine]; and (b) With 29.6 g. of N-(2-cyclohexylamino-ethyl)-p-toluene-sulphonamide, M.P. 65–66° (from ethyl), 1-(p-tolylsulphonyl)-2-imino - 3 - cyclohexyl-imidazolidine, M.P. 118–120° [the starting product is produced analogously to Example 70(c) from 19.7 g. of 1-(tolylsulphonyl)-aziridine and 100 ml. of cyclohexylamine].

EXAMPLE 72

(a) A solution of 11.2 g. of cyanogen bromide in 120 ml. of ether is added during 10 minutes at room temperature to a solution of 35.0 g. of N-[2-(1-adamantylamino)-ethyl]-p-toluenesulphonamide in 175 ml. of dioxane. The resulting suspension is refluxed for 90 minutes at a bath temperature of 70°. The reaction mixture is then concentrated and the oily residue is taken up in 2 N sodium hydroxide solution and methylene chloride. The organic phase is washed with water, dried over sodium sulphate and concentrated. The residue which is partially crystalline is purified by elution chromatography on 580 g. of silica gel. The 1-(p-tolylsulphonyl-2-imino-3-(1-adamantyl)-imidazolidine is eluted with chloroform/ethanol (100:1); after recrystallisation from methanol/methylene chloride it melts at 187–189°. The chloroform/ether fraction (1:1) contains unchanged starting material.

(b) A solution of 19.7 g. of 1-(p-tolylsulphonyl)-aziridine is added during 30 minutes with stirring at 80° to a solution of 15.1 g. of 1-amino-adamantane in 35 ml. of dioxane. After completion of the addition, the reaction solution is stirred 90 minutes longer at a bath temperature of 80°. The reaction mixture is then concentrated and the residue is purified by elution chromatography on a column of 500 g. of silica gel. N-[2-(1-adamantylamino)-ethyl]-p-toluenesulphonamide is obtained from the chloroform/ethanol fractions (9:1) and (4:1). The final product is recrystallised from methanol; it then melts at 117–120°.

EXAMPLE 73

Analogously to Example 72(a) the following end products are obtained from cyanogen bromide:

(a) With N - [2-(1-homoadamantylamino)-ethyl]-p-toluenesulphonamide, M.P. 101–103° (from methanol, hygroscopic), 1-(p-tolylsulphonyl)-2-imino-3-(1-homo-adamantyl)-imdazolidine, M.P. 170–172° [the starting product is produced analogously to Example 72(b) from 1-(p-tolylsulphonyl)-aziridine and 1-amino-homoadamantane]; and (b) With N-[2-(octahydro-1,2,4-methenopentalen-5-ylamino)-ethyl]-p-toluenesulphonamide, M.P. 113–115° (from methanol), 1-(p-tolylsulphonyl)-2-imino-3-(octahydro-1,2,4-methenopentalen-5-yl)-imidazolidine, M.P. 123–124° [the starting product is produced analogously to Example 72(b) from 1-(p-tolylsulphonyl)-aziridine and 5-amino-octahydro-1,2,4-methenopentalene].

EXAMPLE 74

(a) 24.4 g. of N-(2-methylamino-ethyl)-p-methoxybenzenesulphonamide are dissolved in 100 ml. of 2 N sodium hydroxide solution and while cooling at 20–30, 10.6 g. of cyanogen bromide are added thereto. The reaction mixture is allowed to stand for 3 hours and then the crystals which have precipitated are filtered. The crude product is recrystallised from methanol to obtain 1-(p-methoxy-phenylsulphonyl) - 2-imino-3-methyl-imidazolidine melting at 104–107°.

The starting material is produced as follows:

(b) A solution of 20.6 g. of p-methoxy-benzenesulphonyl chloride in 250 ml. of acetone is added dropwise during 20 minutes with stirring to a solution of 4.3 g. of aziridine in 300 ml. of 4 N sodium hydroxide solution which has been cooled to —10°. The reaction mixture is stirred for 2 hours at 0–10° with cooling. Then 2 liters of water are added to the mixture and it is extracted three times with 500 ml. of ether. The ether extract is dried over sodium sulphate and concentrated under vacuum. The residue, 1-(p-methoxy-phenylsulphonyl)-aziridine, melts at 45–46° (from ethyl-acetate/petroleum ether).

(c) A solution of 21.3 g. of 1-(p-methoxy-phenylsulphonyl)-aziridine in 100 ml. of dioxane and 15 ml. of water is added dropwise at room temperature to 300 ml. of 33% methylamine in ethanol, and the reaction mixture is refluxed for one hour. It is then concentrated under vacuum. The residue is purified by elution chromatography on silica gel. From the chloroform/ethanol fraction (9:1) N-(2-methylamino-ethyl)-p-methoxy-benzenesulphonamide is obtained, which melts at 68–69° after recrystallisation from ethyl acetate.

EXAMPLE 75

Analogously to Example 74(a), starting from 10.6 g. of cyanogen bromide, the following end products are obtained:

(a) With 28.6 g. of N-(2-butylamino-ethyl)-p-methoxy-benzenesulphonamide, M.P. 66–68° (from ether), 1-(p-methoxy-phenylsulphonyl) - 2-imino-3-butyl-imidazolidine, M.P. 85–86° [the starting material is produced analogously to Example 74(c) from 21.3 g. of 1-(p-methoxy-phenylsulphonyl)-aziridine and 500 ml. of butylamine); and (b) With 28.6 g. of N-(2-tert. butylamino-ethyl)-p-methoxy - benzenesulphonamide, M.P. 97–99° (from ether), 1-(p-methoxy-phenylsulphonyl)-2-imino - 3 - tert. butyl-imidazolidine, M.P. 107–108° (from methanol) [the starting product is produced analogously to Example 74(c) from 21.3 g. of 1-(p-methoxy-phenylsulphonyl)-aziridine and 500 ml. of tert. butylamine].

EXAMPLE 76

Analogously to Example 74(a), starting from 10.6 g. of cyanogen bromide, the following end product is obtained:

(a) With 28.8 g. of N-(2-propylamino-ethyl)-p-methylthio-benzenesulphonamide, M.P. 79–81° (from ethyl acetate), 1-(p-methylthio-phenylsulphonyl) - 2 - imino-3-propyl-imidazolidine.

(b) The starting material for (a) is produced as follows:

Analogously to Example 74(b), 22.3 g. of p-methylthio-benzenesulphonyl chloride and 4.3 g. of aziridine yield 1-(p-methylthio-phenylsulphonyl)-aziridine (crude product); 22.9 g. of the latter are converted analogously to Example 74(c) with 500 ml. of propylamine to 1-(2-propylamino-ethyl) - p - methylthio-benzenesulphonamide.

EXAMPLE 77

Analogously ot Example 70(a), starting from 10.6 g. of cyanogen bromide, the following end products are obtained:

(a) With 30.2 g. of N-(2-butylamino-ethyl)-p-methylthio-benzenesulphonamide, M.P. 88–89° (from ether), 1-(p-methylthio-phenylsulphonyl) - 2 - imino-3-butyl-imidazolidine, M.P. 87–88° (from ether) [the starting material is produced analogously to Example 70(c) from 22.9 g. of 1-(p-methylthio-phenylsulphonyl)-aziridine and 500 ml. of butylamine] and (b) With 30.2 g. of N-(2-tert. butylamino-ethyl)-p-methylthio-phenylsulphonamide (crude product), 1-(p-methylthio-phenylsulphonyl) - 2 - imino-3-tert. butyl-imidazolidine, M.P. 138–139° (from ethyl acetate) [the starting material is produced analogously to Example 70(c) from 22.9 g. of 1-(p-methylthio-phenylsulphonyl)-aziridine and 500 ml. of tert. butylamine].

In addition, analogously to Example 74(a), starting from 10.6 g. of cyanogen bromide, the following end product is obtained:

(c) With 32.8 g. of N-(2-cyclohexylamino-ethyl)-p-methylthio-benzenesulphonamide, M.P. 131–132° (from methanol), 1-(p-methylthio-phenylsulphonyl)-2-imino-3-cyclohexyl-imidazolidine, M.P. 129–130° (from ethyl acetate) [the starting material is produced analogously to Example 74(c) from 22.9 g. of 1-(p-methylthio-phenylsulphonyl)-aziridine and 300 ml. of cyclohexylamine.

EXAMPLE 78

Analogously to Example 70(a), starting from 10.6 g. of cyanogen bromide, the following is obtained:

(a) With 27.6 g. of N-(2-propylamino-ethyl)-p-chloro-benzenesulphonamide (crude product), 1-(p-chloro-phenylsulphonyl) - 2-imino-3-propyl-imidazolidine. This end product is purified by elution chromatography on silica gel, being eluted with chloroform/ethanol (9:1), M.P. 68–69°.

(b) The starting material is obtained by starting from p-chloro-phenylsulphonyl chloride, which with aziridine, analogously to Example 70(b), yields 1-(p-chloro-phenylsulphonyl)-aziridine (crude product); 21.7 g. of this aziridine are converted with 300 ml. of propylamine analogously to Example 70(c) to N-(2-propylamino-ethyl)-p-chloro-benzenesulphonamide.

EXAMPLE 79

Analogously to Example 70(a), starting from 10.6 g. of cyanogen bromide, the following end products are obtained:

(a) With 29.0 g. of N-(2-butylamino-ethyl)-p-chloro-benzenesulphonamide (crude product), 1-(p-chloro-phenylsulphonyl) - 2 - imino - 3 - butyl - imidazolidine, M.P. 74–75° [the starting material is produced analogously to Example 70(c) from 21.7 g. of 1-(p-chloro-phenylsulphonyl)-aziridine and 300 ml. of butylamine]; and (b) With 31.6 g. of N-(2-cyclohexylamino-ethyl)-p-chlorobenzenesulphonamide, M.P. 83–84° (from ethylacetate/ether), 1 - (p - chloro-phenylsulphonyl)-2-imino-3-cyclohexyl-imidazolidine, M.P. 108–110° [the starting material is produced analogously to Example 70(c) from 21.7 g. of 1-(p-chloro-phenylsulphonyl)-aziridine and 300 ml. of cyclohexylamine].

EXAMPLE 80

Analogously to Example 70(a), starting from 10.6 g. of cyanogen bromide, the following end products are obtained:

(a) With 24.2 g. of N-(2-propylamino-ethyl)-benzenesulphonamide, M.P. 72–73° (from ethyl acetate), 1-phenylsulphonyl - 2 - imino - 3 - propyl-imidazolidine, M.P. 69–70° (from ether) [the starting material is produced analogously to Example 70(c) from 18.3 g. of 1-phenylsulphonyl-aziridine (cf. J. Nelles et al., German Pat. No. 695,331) and 300 ml. of propylamine];

(b) With 24.2 g. of N-(2-isopropylamino-ethyl)-benzenesulphonamide, M.P. 59–60° (from ethyl acetate), 1-phenylsulphonyl - 2 - imino - 3 - isopropyl-imidazolidine, M.P. 71–72° (from ethyl acetate/ether) [the starting material is produced analogously to Example 70(c) from 18.3 g. of 1-phenylsulphonyl-aziridine and 300 ml. of isopropylamine];

(c) With 25.6 g. of N - (2-butylamino-ethyl)-benzene-sulphonamide, M.P. 56–57° (from ether), 1-phenylsulphonyl - 2 - imino - 3 - butyl - imidazolidine, M.P. 84–85° (from ether) [the starting material is produced analogously to Example 1(c) from 18.3 g. of 1-phenylsulphonyl-aziridine and 300 ml. of butylamine];

(d) With 25.6 g. of N-(2-tert. butylamino-ethyl)-benzenesulphonamide, M.P. 89–90° (from ethyl acetate), 1-phenylsulphonyl - 2 - imino-3 - tert. butyl-imidazolidine, M.P. 98–100° (from ethyl acetate/ether) [the starting material is produced analogously to Example 70(c) from 18.3 g. of 1-phenylsulphonylaziridine and 300 ml. tert. butylamine]; and (e) With 28.2 of N-(2-cycloxylamino-ethyl)-benzenesulphonamide, M.P. 79–80° (from ethyl acetate), 1-phenylsulphonyl-2-imino-3-cyclohexyl-imidazolidine, M.P. 94–95° (from ethyl acetate/ether) [the starting material is produced analogously to Example 70(c) from 18.3 g. of 1-phenylsulphonylaziridine and 300 ml. of cyclohexylamine].

EXAMPLE 81

Analogously to Example 70(a), starting from 10.6 g. of cyanogen bromide, the following end product is obtained:

(a) With 29.8 g. of N-(2-tert. butylamino-ethyl)-p-acetyl-benzenesulphonamide, M.P. 116–117° (from isopropanol), 1 - (p - acetyl-phenylsulphonyl-2-imino-3-tert. butyl-imidazolidine, M.P. 144–146° (from isopropanol).

(b) The starting product for (a) is produced starting from p-acetyl-benzenesulphonyl chloride, which with aziridine analogously to Example 70(b) yields 1-(p-acetyl-phenylsulphonyl)-aziridine (crude product). 22.5 g. of this aziridine are converted analogously to Example 70(c) with 300 ml. of tert. butyl-amine to N-(tert. butyl-amino-ethyl)-p-acetyl-sulphonamide.

EXAMPLE 82

Analogously to Example 70(a), starting from 10.6 g. of cyanogen bromide, the following end products are obtained:

(a) With 29.8 g. of N-(2-butylamino-ethyl)-p-acetyl-benzenesulphonamide, M.P. 89–90° (from isopropanol), 1 - (p - acetyl-phenylsulphonyl)-2-imino-3-butyl-imidazolidine, M.P. 120–122° (from isopropanol) [the starting material is produced analogously to Example 70(c) from 22.5 g. of 1-(p-acetyl-phenylsulphonyl)-aziridine and 300 ml. of butylamine]; and (b) With 40.7 g. of N-(2-cyclohexylamino-ethyl)-p-(1 - cyclohexylimino-ethyl)-benzenesulphonamide, M.P. 85–86° (from isopropanol), 1-(p-acetyl-phenylsulphonyl)-2 - imino - 3 - cyclohexyl-imidazolidine, M.P. 164–166° (from isopropanol) [the starting product is produced analogously to Example 70(c) from 22.5 g. of 1-(p-acetyl-phenylsulphonyl)-aziridine and 300 ml. of cyclohexylamine].

EXAMPLE 83

Analogously to Example 70(a) starting from 10.6 g. of cyanogen bromide, the following end product is obtained:

(a) With 27.4 g. of N-(2-butylamino-ethyl)-p-fluoro-benzenesulphonamide (crude product), 1-(p-fluoro-phenylsulphonyl) - 2 - imino - 3 - butyl-imidazolidine, M.P. 74–76°.

(b) The starting material for (a) can be produced starting from p-fluoro-benzenesulphonyl chloride, which, analogously to Example 70(b), is converted with aziridine to 1-(p-fluorophenylsulphonyl)-aziridine, 20.1 g. of which with 150 ml. of butylamine yield, analogously to Example 70(c), N - (2-butylaminoethyl)-p-fluoro-benzenesulphonamide.

EXAMPLE 84

Analogously to Example 70(a), starting from 10.6 g. of cyanogen bromide, the following end product is obtained (a) With 27.0 g. of N-(1-methyl-2-propylamino-ethyl)-p-toluenesulphonamide, M.P. 91–92°, 1-(p-tolylsulphonyl)-2-imino - 3 - propyl - 5 - methyl - imidazolidine, B.P. 183–189°/0.01 torr.

(b) The starting material for (a) can be produced starting from p-toluenesulphonyl chloride, which, analogously to Example 70(b), is converted with 2-methyl-aziridine to 1-(p-tolylsulphonyl)-2-methyl-aziridine, M.P. 63–65°, 21.1 g. of which, analogously to Example 70(c), with 150 ml. of propylamine yield N-(1-methyl-2-propyl-amino-ethyl)-p-toluenesulphonamide.

EXAMPLE 85

Analogously to Example 70(a), starting from 10.6 g. of cyanogen bromide, the following end products are obtained:

(a) With 28.4 g. of N-(1-methyl-2-butylamino-ethyl)-p-toluenesulphonamide, M.P. 73–75° (from ether), 1-(p-tolylsulphonyl - 2 - imino - 3 - butyl-5-methyl-imidazolidine, B.P. 173–179°/0.01 torr [the starting material is produced analogously to Example 70(c) from 21.1 g. of 1-(p - tolylsulphonyl) - 2-methyl-aziridine and 150 ml. of butylamine];

(b) With 28.4 g. of N-(1-methyl-2-tert. butylamino-ethyl) - p - toluenesulphonamide, M.P. 82–83° (from ether), 1 - (p-tolylsulphonyl) - 2 - imino - 3 - tert. butyl-5-methyl-imidazolidine, M.P. 92–94° (from ether) [the starting material is produced analogously to Example 70(c) from 21.1 g. of 1-(p-tolylsulphonyl)-2-methyl-aziridine and 150 ml. of tert. butylamine; and (c) With 31.0 g. of N-(1-methyl-2-cyclohexylamino-ethyl)-p-toluenesulphonamide, M.P. 58–59° (from ether), 1 - (p - tolylsulphonyl) - 2-imino-3-cyclohexyl-5-methyl-imidazolidine, M.P. 93–94° (from ether) [the starting material is produced analogously to Example 70(c) from 21.1 g. of 1-(p-tolylsulphonyl)-2-methyl-aziridine and 150 ml. of cyclohexylamine].

EXAMPLE 86

Analogously to Example 70(a), starting from 12,2 g. of cyanogen bromide, the following end product is obtained:

(a) With 28.2 g. of N-(2-methylamino-cyclohexyl)-p-toluenesulphonamide, M.P. 92–93° (from cyclohexane), 1-(p-tolylsulphonyl)-2-imino-3 - methyl-hexahydro-benzimidazoline, M.P. 184–185° (from isopropanol).

(b) The starting material for (a) can be produced as follows: Starting from p-toluenesulphonyl chloride, it is reacted, analogously to Example 70(b), with 7-azabicyclo[4.1.0]heptane [cf. O. E. Paris et al., J. Am. Chem. Soc., 74, 3007 (1952)] to give 7-(p-tolylsulphonyl)-7-azabicyclo[4.1.0]heptane, M.P. 59–61° (from cyclohexane) analogously to Example 70(c), 25.1 g. of this intermediate product with 300 ml. 33% ethanolic methyl-amine yield N-(2-methylamino-cycloclohexyl)-p-toluenesulphonamide.

EXAMPLE 87

Analogously to Example 70(a), starting from 12.2 g. of cyanogen bromide, the following end products are obtained:

(a) With 32.4 g. of N-(2-butylamino-cyclohexyl)-p-toluenesulphonamide, M.P. 107–108°, 1-(p-tolylsulphonyl)-2-imino-3-butyl - hexahydro - benzimidazoline, M.P. 138–140° (from isopropanol) [the starting material is produced analogously to Example 70(c) from 25.1 g. of 7-(p-tolylsulphonyl)-7-azabicyclo[4.1.0]heptane and 300 ml. of butylamine]; and (b) With 35.8 g. of N-(2-benzylamino-cyclohexyl)-p-toluenesulphonamide, M.P. 118–119° (from cyclohexane), 1-(p-tolylsulphonyl)-2-imino-3-benzyl-hexahydro-benzimidazoline, M.P. 157–158° (from isopropanol) [the starting material is produced analogously to Example 70(c) from 25.1 g. of 7-(p-tolylsulphonyl)-7-azabicyclo[4.1.0]heptane and 300 ml. of benzylamine].

EXAMPLE 88

Analogously to Example 70(a), starting from 12.2 g. of cyanogen bromide, the following end product is obtained:

(a) With 29.8 g. of N-(1,1-dimethyl-2-butylaminoethyl)-p-toluenesulphonamide (crude product), 1-(p-tolylsulfonyl)-2-imino-3-butyl - 5,5-dimethyl - imidazolidine, M.P. 72–74° (from cyclohexane).

The starting material is produced as follows:

(b) 8.9 g. of 2-amino-2-methyl-1-propanol are dissolved in 150 ml. of absolute pyridine. The solution is cooled with Dry Ice/acetone to −10° and during 30 minutes while stirring well 44.0 g. of p-toluene sulphonyl chloride are added in portions at a reaction temperature of −10° to 0°. The brown solution is then stirred 4 hours longer at 0° and poured on to 550° ml. of ice water. A resin precipitates which slowly crystallises. The crystals are removed by filtration, washed with water and dried under vacuum at 80°. The resulting N-[1,1-dimethyl-2-(p-tolylsulphonyloxy) - ethyl] - p-toluenesulphonamide melts at 98–100° (crude product).

(c) 39.75 g. of the sulphonamide obtained according to (b) are suspended in 150 ml. of toluene and 150 ml. of butylamine are added to the suspension. The reaction mixture dissolves. The solution is allowed to stand for 4 hours at room temperature and then concentrated. The residue is treated with water and concentrated ammonia, and the base which precipitates is extracted with ethyl acetate. The extract is concentrated under vacuum, to leave crude N-(1,1-dimethyl-2 - butylaminoethyl)-p-toluenesulphonamide as residue.

EXAMPLE 89

Analogously to Example 70(a), starting from 12.2 g. of cyanogen bromide, the following end products are obtained:

(a) With 32.4 g. of N-(1,1-dimethyl-2-cyclohexylaminoethyl)-p-toluenesulphonamide (crude product), 1-(p-tolylsulphonyl)-2-imino-3 - cyclohexyl - 5,5-dimethyl-imidazolidine, M.P. 121–122° (from cyclohexane) [the starting product is produced analogously to Example 88(c) from 39.7 g. of N-[1,1-dimethyl-2-(p-tolylsulphonyloxy)-ethyl]-p-toluenesulphonamide and 150 ml. of cyclohexylamine]; and (b) With 8.9 g. of N-(1-ethyl-2-allylamino-ethyl)-p-toluenesulphonamide (crude product), 1-(p-tolylsulphonyl)-2-imino-3-allyl-5-ethyl-imidazolidine, M.P. 75–77° (from benzene/cyclohexane) [the starting material is produced as follows: Starting from 44.0 g. of p-toluenesulphonyl chloride, it yields, analogously to Example 88(b), with 8.9 g. of 2-amino-1-butanol, N-[1-ethyl-2-(p-tolylsulphonyloxy)-ethyl] - p - toluenesulphonamide, 39.75 g. of which, analogously to Example 88(c), are reacted with 150 ml. of allylamine].

EXAMPLE 90

A solution of 10.6 g. of cyanogen bromide in 50 ml. of absolute ether is added with stirring at −10° to −5° within 30 minutes to a solution of 14.6 g. of butylamine in 100 ml. of absolute ether. The reaction mixture is stirred for 30 minutes more and the precipitated butylamine-hydrobromide is removed by filtration. While cooling is continued, a suspension of 2.8 g. of sodium hydride in 40 ml. of absolute ether is added to the filtrate which contains the resultant butylcyanamide in solution. While cooling at this temperature is continued, the suspension is stirred for another 30 minutes and then 19.7 g. of 1-(p-tolylsulphonyl)-aziridine are added to the suspended sodium derivative of butyl cyanamide which has formed. The mixture is warmed to room temperature and stirred for 15 hours at this temperature. 2 N hydrochloric acid is then slowly added to the reaction mixture and the two phases which form are separated. The acidic aqueous phase is washed twice with ether, purified with active charcoal, filtered and rendered alkaline with concentrated sodium hydroxide solution at 0°. The precipitated 1-(p-tolylsulphonyl)-2-imino-3 - butyl-imidazolidine is separated by filtration and recrystallised from methanol; it then melts at 91–92°.

EXAMPLE 91

Analogously to Example 90, the following end products are obtained:

(a) From 14.6 g. of tert. butylamine in 100 ml. of ether with 10.6 g. of cyanogen bromide, tert. butylcyanamide, which with 2.8 g. of sodium hydride in 40 ml. of ether is converted to the sodium derivative; this yields with 21.1 g. of 1-(p-tolylsulphonyl)-2-methyl-aziridine, 1-(p-tolylsulphonyl)-2-imino-tert. butyl - 5 - methyl-imidazolidine, M.P. 92–94°;

(b) From 14.6 g. of butylamine in 100 ml. of ether with 10.6 g. of cyanogen bromide, butyl-cyanamide, which with 2.8 g. of sodium hydride in 40 ml. of ether is converted to the sodium derivative; this with 21.3 g. of 1-(p-methoxy-phenylsulphonyl)-aziridine yields 1-(p-methoxy - phenylsulphonyl)-2-imino-3-butyl - imidazolidine, M.P. 85–86°;

(c) From 19.8 g. of cyclohexylamine in 100 ml. of ether with 10.6 g. of cyanogen bromide, cyclohexylcyanamide, which with 2.8 g. of sodium hydride in 40 ml. of ether is converted to the sodium derivative; this with 21.75 g. of 1-(p-chloro-phenylsulphonyl)-aziridine yields 1 - (p - chloro - phenylsulphonyl) - 2 - imino - 3 - cyclohexyl-imidazolidine, M.P. 108–110°; and (d) From 11.8 g. of isopropylamine in 100 ml. of ether with 10.6 g. of cyanogen bromide, isopropyl-cyanamide, which with 2.8 g. of sodium hydride in 40 ml. of ether is converted to the sodium derivative; this with 18.4 g. of 1-phenylsulphonyl-aziridine yields 1 - phenylsulphonyl-2-imino-3-isopropyl-imidazolidine, M.P. 71–72°.

EXAMPLE 92

9.9 g. of 1-butyl-aziridine [cf. A. Weissberger, Heterocyclic Compounds With Three and Four-Membered Rings, John Wiley & Sons Inc., London (1964), p. 530] are dissolved in 50 ml. of dioxane, and 10.6 g. of cyanogen bromide in 50 ml. of dioxane are added thereto. In an exothermic reaction a solution of N-(2-bromo-ethyl)-N-butyl-cyanamide is obtained, which is poured with stirring into a solution of 17.1 g. of toluene-sulphonamide in 60 ml. of 2 N sodium hydroxide solution. The reaction mixture is refluxed for one hour, then concentrated to half its volume under vacuum, and the solution is cooled to 0°. The precipitated crystals are separated by filtration, washed with water, dried under vacuum at 60° and recrystallised from ether. The resulting 1-(p-tolylsulphonyl)-2-imino-3-butyl-imidazolidine melts at 91–92°.

EXAMPLE 93

Analogously to Example 92 the following end products are obtained:

(a) From 9.9 g. of 1-tert. butyl-aziridine with 10.6 g. of cyanogen bromide in dioxane, the solution of N-(2-bromo-ethyl)-N-tert. butyl-cyanamide, which with 17.1 g. of p-toluenesulphonamide in 60 ml. of 2 N sodium hydroxide solution yields 1-(p-tolylsulphonyl)-2-imino-3-tert. butyl-imidazolidine, M.P. 131–132° (from ethyl acetate);

(b) From 13.5 g. of 1-cyclohexyl-aziridine with 10.6 g. of cyanogen bromide in dioxane, the solution of N-(2-bromo-ethyl)-N-cyclohexyl-cyanamide, which with 17.1 g. of p-toluenesulphonamide in 60 ml. of 2 N sodium hydroxide solution yields 1-(p-tolylsulphonyl)-2-imino-3-cyclohexyl-imidazolidine, M.P. 118–120° (from methanol) and (c) From 9.9 g. of 1-butyl-aziridine with 10.6 g. of cyanogen bromide in dioxane, the solution of N-(2-bromo-ethyl)-N-butyl-cyanamide, which with 18.7 g. of p-methoxy-benzene-sulphonamide in 60 ml. of 2 N sodium hydroxide solution yields 1-(p-methoxy-phenylsulphonyl)-2 - imino - 3 - butyl - imidazolidine, M.P. 85–86° (from methanol);

(d) From 9.9 g. of 1-tert. butyl-aziridine with 10.6 g. of cyanogen bromide in dioxane, the solution of N-(2-bromo-ethyl)-N-tert. butyl-cyanamide, which with 18.7 g. of p-methoxy-benzene-sulphonamide in 60 ml. of 2 N sodium hydroxide solution yields 1-(p-methoxy-phenyl-sulphonyl)-2-imino-3-tert. butyl-imidazolidine, M.P. 107–108° (from methanol);

(e) From 9.9 g. of 1-butyl-aziridine with 10.6 g. of cyanogen bromide in dioxane, the solution of N-(2-bromo-ethyl)-N-butyl cyanamide, which with 20.3 g. of p-methylthio-benzene-sulphonamide in 60 ml. of 2 N sodium hydroxide solution yields 1-(p-methylthio-phenyl-sulphonyl)-2-imino-3-butyl - imidazolidine, M.P. 87–88° (from ether);

(f) From 9.9 g. of 1-tert. butyl-aziridine with 10.6 g. of cyanogen bromide in dioxane, the solution of N-(2-bromo-ethyl)-N-tert. butyl-cyanamide, which with 20.3 g. of p-methylthiobenzenesulphonamide in 60 ml. of 2 N sodium hydroxide solution yields 1-(p-methylthio-phenyl-sulphonyl)-2-imino-3-tert. butyl-imidazolidine, M.P. 138–139° (from ethyl acetate);

(g) From 12.5 g. of 1-cyclohexyl-aziridine with 10.6 g. of cyanogen bromide in dioxane, the solution of N-(2-bromo-ethyl)-N-cyclohexyl-cyanamide, which with 20.3 g. of p-methylthiobenzenesulphonamide in 60 ml. of 2 N sodium hydroxide solution yields 1-(p-methylthio-phenyl-sulphonyl)-2-imino-3-cyclohexyl-imidazolidine, M.P. 129–130° (from ethyl acetate);

(h) From 8.5 g. of 1-propyl-aziridine with 10.6 g. of cyanogen bromide in dioxane, the solution of N-(2-bromo-ethyl)-N-propyl-cyanamide, which with 19.1 g. of p-chloro-benzenesulphonamide in 60 ml. of 2 N sodium hydroxide solution yields 1-(p-chloro-phenylsulphonyl)-2-imino-3-propyl-imidazolidine, M.P. 68–69°;

(i) From 9.9 g. of 1-butyl-aziridine with 10.6 g. of cyanogen bromide in dioxane, the solution of N-(2-bromo-ethyl)-N-butyl-cyanamide, which with 19.1 g. of p-chloro-benzene-sulphonamide in 60 ml. of 2 N sodium hydroxide solution yields 1-(p-chloro-phenylsulphonyl)-2-imino-3-butyl-imidazolidine, M.P. 74–75° (from ether);

(j) From 12.5 g. of 1-cyclohexyl-aziridine with 10.6 g. of cyanogen bromide in dioxane, the solution of N-(2-bromo-ethyl)-N-cyclohexyl-cyanamide, which with 19.1 g. of p-chloro-benzene-sulphonamide in 60 ml. of 2 N sodium hydroxide solution yields 1-(p-chloro-phenylsul-phonyl)-2-imino-3-cyclohexyl - imidazolidine, M.P. 108–110 (from ethyl acetate/ether);

(k) From 8.5 g. of 1-isopropyl-aziridine with 10.6 g. of cyanogen bromide in dioxane, the solution of N-(2-bromo-ethyl)-N-isopropyl-cyanamide, which with 15.7 g. of benzenesulphonamide in 60 ml. of 2 N sodium hydroxide solution yields 1-phenyl-sulphonyl-2-imino-3-isopropyl-imidazolidine, M.P. 71–72° (from ethyl acetate/ether); and (l) From 12.5 g. of 1-cyclohexyl-aziridine with 10.6 g. of cyanogen bromide in dioxane, the solution of N-(2-bromo-ethyl)-N-cyclohexyl-cyanamide, which with 15.7 g. of benzenesulphonamide in 60 ml. of 2 N sodium hydroxide solution yields 1-phenyl-sulphonyl-2-imino-3-cyclohexyl-imidazolidine, M.P. 94–95° (from ethyl acetate).

EXAMPLE 94

(a) 30.3 g. of N-(2-bromo-ethyl)-N-cyano-p-toluene-sulphonamide are dissolved in 500 ml. of ethanol and 7.3 g. of tert. butylamine, and refluxed for 17 hours. The reaction mixture is concentrated and the residue is taken up in chloroform and 2 N hydrochloric acid. The acidic aqueous extract is rendered alkaline with concentrated sodium hydroxide solution. The crude product precipitates; it is filtered and purified by recrystallisation from ethyl acetate. The resulting 1-(p-tolylsulphonyl)-2-imino-3-tert. butyl-imidazolidine melts at 130–131°.

The starting material is produced as follows:

(b) During 30 minutes a solution of 4.3 g. of aziridine in 20 ml. of ether is added dropwise at 0° to a solution of 10.6 g. of cyanogen bromide in 30 ml. of ether. The resulting suspension is concentrated under vacuum at a bath temperature of 40°. The residue is slurried in 60 ml. of water and a solution of 19.9 g. of p-toluenesulphonyl chloride in 190 ml. of acetone is added to the suspension. 4.5 g. of sodium hydroxide in 10 ml. of water are then added dropwise during 10 minutes and the resulting mixture is refluxed for 30 minutes. After cooling, the crude product crystallises. It is filtered. Upon dilution with water, the filtrate yields another batch of crude product, which is separated and combined with the first fraction. The two fractions are recrystallised from methanol to yield N-(2-bromo-ethyl)-N-cyano-p-toluenesulphonamide melting at 67–69°.

EXAMPLE 95

Analogously to Example 94, starting from 30.3 g. of N - (2 - bromo-ethyl)-N-cyano-p-toluenesulphonamide in 500 ml. of ethanol, the following are obtained:

(a) With 5.9 g. of propylamine, 1-(p-tolylsulphonyl)-2-imino-3-propyl-imidazolidine, M.P. 95–96°; and (b) With 9.9 g. of cyclohexylamine, 1-(p-tolylsulphon-yl) - 2 - imino-3-cyclohexyl-imidazolidine, M.P. 118–120° (from methanol).

EXAMPLE 96

(a) 36.0 g. of N-(N'-benzyl-2-butylamino-ethyl)-p-toluenesulphonamide are dissolved in 500 ml. of benzene. 10.6 g. of cyanogen bromide are added to the solution, the reaction mixture is stirred for 3 hours at room temperature and then concentrated. The residue is rendered alkaline with 2 N sodium hydroxide solution. Crystals precipitate, which are washed with water and recrystallised from methanol/ether. The resulting, pure 1-(p-tolylsul-phonyl) - 2 - imino-3-butyl-imidazolidine melts at 91–92° (from ether).

The starting material is produced as follows:

(b) 24.0 g. of 1-(p-tolylsulphonyl)-aziridine are dissolved in 100 ml. of dioxane and 20 ml. of water, and refluxed for 5 hours with stirring. The reaction mixture is then concentrated. The residue, N-(N'-benzyl-2-butyl-amino-ethyl)-p-toluenesulphonamide, is used as crude product.

EXAMPLE 97

(a) 33.15 g. of the addition salt of p-tolylsulphonyl cyanamide and N-(2-chloro-ethyl)-tert. butylamine are heated for one hour at a bath temperature of 145°. The melt is cooled and triturated with 2 N hydrochloric acid. The solution is decanted to remove insoluble resin and rendered alkaline with concentrated sodium hydroxide solution. The precipitated 1-(p-tolylsulphonyl)-2-imino-3-tert. butyl-imidazolidine is filtered, rinsed with water and recrystallised from ethyl acetate; it then melts at 130–131°.

The starting material is produced as follows:

(b) 19.0 g. of p-toluenesulphonyl chloride and 50 ml. of dioxane are added with stirring to a solution of 8.6 g. of disodium cyanamide in 100 ml. of water. An exothermic reaction takes place and the p-toluenesulphonyl chloride dissolves. The solution is stirred for 15 minutes and then a solution of 17.2 g. of N-(2-chloro-ethyl)-tert. butyl-amine-hydrochloride in 40 ml. of water is added. The reaction mixture is allowed to stand at room temperature for 2 hours; it is then concentrated to half its volume. The oil which precipitates is extracted with methylene chloride, the organic phase is separated, dried over sodium sulphate and concentrated. The residue, the addition salt of p-toluenesulphonyl cyanamide and N - (2 - chloro-ethyl)-tert. butylamine, is recrystallised from isopropanol; it then melts at 103–104°.

EXAMPLE 98

17.8 g. of 1-butyl-2-imino-imidazolidine-hydrochloride are dissolved in 100 ml. of water and 6.0 g. of sodium hydroxide are added thereto. Then a solution of 19.0 g. of p-toluenesulphonyl chloride in 100 ml. of acetone is added with stirring. The reaction mixture is refluxed for one hour and then concentrated under vacuum to half its volume. The oily residue crystallises during cooling. The crystals are filtered, dried under vacuum at room temperature and recrystallised several times from hexane. The pure 1 - (p - tolylsulphonyl)-2-imino-3-butyl-imidazolidine melts at 91–92°.

EXAMPLE 99

Analogously to Example 98, the following end products are obtained:

(a) From 17.8 g. of 1-tert. butyl-2-imino-imidazolidine-hydrochloride in sodium hydroxide solution and 19.0 g. of p-toluenesulphonyl chloride, 1-(p-tolylsulphonyl)-2-imino-3-tert. butyl-imidazolidine, M.P. 130–131° (from ethyl acetate);

(b) From 20.4 g. of 1-cyclohexyl-2-imino-imidazolidine-hydrochloride in sodium hydroxide solution and 19.0 g. of p-toluenesulphonyl chloride, 1-(p-tolylsulphonyl)-2-imino-3-cyclohexyl-imidazolidine, M.P. 118–120° (from methanol);

(c) From 22.6 g. of 1-phenethyl-2-imino-imidazolidine-hydrochloride in sodium hydroxide solution and 19.0 g. of p-toluenesulphonyl chloride, 1-(p-tolylsulphonyl)-2-imino-3-phenethyl-imidazolidine;

(d) From 17.8 g. of 1-butyl-2-imino-imidazolidine-hydrochloride in sodium hydroxide solution and 20.6 g. of p-methoxy-benzenesulphonyl chloride, 1-(p-methoxy-phenylsulphonyl)-2-imino-3-butyl-imidazolidine, M.P. 85–87° (from methanol);

(e) From 17.8 g. of 1-tert. butyl-2-imino-imidazolidine-hydrochloride in sodium hydroxide solution and 20.6 g. of p-methoxy-benzenesulphonyl chloride, 1-(p-methoxy-phenylsulphonyl)-2-imino-3-tert. butyl-imidazolidine, M.P. 107–108° (from methanol);

(f) From 17.8 g. of 1-butyl-2-imino-imidazolidine-hydrochloride in sodium hydroxide solution and 22.2 g. of p-methylthio-benzenesulphonyl chloride, 1-(p-methylthio - phenylsulphonyl) - 2 - imino-3-butyl-imidazolidine, M.P. 87–88° (from ether);

(g) From 17.8 g. of 1-tert. butyl-2-imino-imidazolidine-hydrochloride in sodium hydroxide solution and 22.2 g. of p-methylthio-benzenesulphonyl chloride, 1-(p-methylthio-phenylsulphonyl)-2-imino-3-tert. butyl-imidazolidine, M.P. 138–139° (from ethyl acetate);

(h) From 20.4 g. of 1-cyclohexyl-2-imino-imidazolidine-hydrochloride in sodium hydroxide solution and 22.2 g. of p-methylthio-benzenesulfonyl chloride, 1-(p-methylthio - phenylsulphonyl) - 2 - imino-3-cyclohexyl-imidazolidine, M.P. 129–130° (from ethyl acetate);

(i) From 16.4 g. of 1-propyl-2-imino-imidazolidine-hydrochloride in sodium hydroxide solution and 21.0 g. of p-chlorobenzenesulphonyl chloride, 1-(p-chloro-phenylsulphonyl)-2-imino-3-propyl-imidazolidine, M.P. 68–69°;

(j) From 17.8 g. of 1-butyl-2-imino-imidazolidine-hydrochloride in sodium hydroxide solution and 21.0 g. of p-chlorobenzenesulphonyl chloride, 1-(p - chloro-phenylsulphonyl)-2-imino-3-butyl-imidazolidine, M.P. 74–75° (from ether);

(k) From 20.4 g. of 1-cyclohexyl-2-imino-imidazolidine-hydrochloride in sodium hydroxide solution and 21.0 g. of p-chloro-benzenesulphonyl chloride, 1-(p-chloro-phenyl-sulphonyl)-2-imino - 3 - cyclohexyl-imidazolidine, M.P. 108–110° (from ethyl acetate/ether);

(l) From 16.4 g. of 1-propyl-2-imino-imidazolidine-hydrochloride in sodium hydroxide solution and 17.6 g. of benzenesulphonyl chloride, 1-phenylsulphonyl-2-imino-3-propyl-imidazolidine, M.P. 69–70° (from ether);

(m) From 17.8 g. of 1-butyl-2-imino-imidazolidine-hydrochloride in sodium hydroxide solution and 17.6 g. of benzenesulphonyl chloride, 1-phenylsulphonyl-2-imino-3-butyl-imidazolidine, M.P. 84–85° (from ether);

(n) From 17.8 g. of 1-tert. butyl-2-imino-imidazolidine-hydrochloride in sodium hydroxide solution and 17.6 g. of benzenesulphonyl chloride, 1-phenylsulphonyl-2-imino-3-tert. butyl-imidazolidine, M.P. 98–100° (from ethyl acetate/ether);

(o) From 20.4 g. of 1-cyclohexyl-2-imino-imidazolidine-hydrochloride in sodium hydroxide solution and 17.6 g. of benzenesulphonyl chloride, 1-phenylsulphonyl-2-imino-3-cyclohexyl-imidazolidine, M.P. 94–95° (from ethyl acetate/ether);

(p) From 16.2 g. of 1-allyl-2-imino-imidazolidine-hydrochloride in sodium hydroxide solution and 21.8 g. of p-acetyl-benzenesulphonyl chloride, 1-(p-acetyl-phenylsulphonyl)-2-imino-3-allyl-imidazolidine, M.P. 104–105° (from benzene);

(q) From 17.8 g. of 1-tert. butyl-2-imino-imidazolidine-hydrochloride in sodium hydroxide solution and 21.8 g. of p-acetyl-benzenesulphonyl chloride, 1 - (p-acetyl-phenylsulphonyl)-2-imino-3-tert. butyl-imidazolidine, M.P. 144–147° (from isopropanol);

(r) From 17.8 g. of 1-butyl-2-imino-imidazolidine-hydrochloride in sodium hydroxide solution and 21.8 g. of p-acetyl-benzenesulphonyl chloride, 1-(p-acetyl-phenylsulphonyl)-2-imino-3-butyl-imidazolidine, M.P. 120–122° (from isopropanol);

(s) From 20.4 g. of 1-cyclohexyl-2-imino-imidazodine-hydrochloride in sodium hydroxide solution and 21.8 g. of p-acetyl-benzenesulphonyl chloride, 1-(p-acetyl-phenylsulphonyl)-2-imino-3-cyclohexyl - imidazolidine, M.P. 164–166° (from isopropanol);

(t) From 17.8 g. of 1-butyl-2-imidazolidine-hydrochloride in sodium hydroxide solution and 19.4 g. of p-fluoro-benzenesulphonyl chloride, 1-(p-fluoro-phenylsulphonyl)-2 - imino - 3 - butyl - imidazolidine, M.P. 74–76° (from benzene);

(u) From 23.7 g. of 1-butyl-2-imino-4-methyl-imidazolidine-hydrobromide in sodium hydroxide solution and 19.0 g. of p-toluenesulphonyl chloride, 1-(p-tolylsulphonyl)-2-imino-3-butyl - 5 - methyl-imidazolidine, B.P. 173–179°/0.01 torr;

(v) From 23.7 g. of 1-tert. butyl-2-imino-4-methyl-imidazolidine-hydrobromide in sodium hydroxide solution and 19.0 g. of p-toluenesulphonyl chloride, 1-(p-tolylsulphonyl)-2-imino-3-tert. butyl-5-methyl - imidazolidine, M.P. 92–94° (from ether); and (w) From 23.7 g. of 1-tert. butyl-2-imino-4-methyl-imidazolidine-hydrobromide in sodium hydroxide solution and 21.0 g. of p-chloro-benzenesulphonyl chloride, 1-(p-chloro - phenylsulphonyl)-2-imino-3-tert. butyl-5-methyl-imidazolidine.

EXAMPLE 100

30.7 g. of 1-(p-tolylsulphonyl)-2-imino-3-allyl-5-ethyl-imidazolidine are hydrogenated at room temperature and under normal pressure in 350 ml. of dioxane with 5.0 g. of 5% palladium charcoal. When no more hydrogen is taken up, the catalyst is removed by filtration, washed again with dioxane and the filtrate is concentrated to yield 1-(p-tolylsulphonyl)-2-imino-3-propyl - 5 - ethyl-imidazolidine, M.P. 61–63° (from ether/petroleum ether).

EXAMPLE 101

(a) 23.6 g. (0.1 mol) of t-tert. butyl-2-imino-5-methyl-imidazolidine hydrobromide are dissolved in 100 ml. of water and treated with a solution of 19.05 g. (0.1 mol) of p-toluenesulfochloride in 200 ml. of acetone. A solution of 10 g. of sodium hydroxide in 40 ml. of water is then added dropwise during 10 minutes to the mixture. The resulting suspension is refluxed for 45 minutes, then cooled and concentrated. Water is added to the residue and the oily product which precipitates is extracted with methylene chloride. The oily 1-p-toluenesulphonyl-2-imino-3-tert. butyl-4-methyl-imidazolidine is distilled under vacuum, B.P. 195–202°/0.07 torr. After standing, the substance crystallises, M.P. 81–84°.

The starting material, 1-tert. butyl-2-imino-5-methyl-imidazolidine, is produced as follows:

(b) 12.7 g. of α-chloropropionic acid chloride are dissolved in 50 ml. of chloroform and added dropwise during 45 minutes to a solution of 22 g. of benzylamine in 70 ml. of chloroform. The thick reaction mixture is stirred for one hour at room temperature and then water is added. The benzylamine dissolves. The chloroform layer is separated and washed once with water; the aqueous phases are extracted with chloroform. The combined chloroform phases are dried with sodium sulphate, filtered and concentrated. α-Chloro-propionic acid-benzylamide is obtained as residue, which, recrystallised from methylene chloride/cyclohexane, melts at 74–76°.

(c) 19.75 g. of α-chloro-propionic acid-benzylamide are dissolved in 20 g. of tert. butylamine and the resulting solution is heated 3½ hours in an autoclave at 150°. The reaction mixture is then diluted with ether and water. The ether layer is separated and extracted several times with 6 N hydrochloric acid. The aqueous acidic phases are combined and, while cooling, rendered alkaline with concentrated sodium hydroxide solution. The oil which precipitates is extracted with ether; the ethereal solution is separated, dried with sodium sulphate, filtered and concentrated. The resulting α-tert. butylamino-propionic acid-benzylamide is distilled, B.P. 110–120/0.01 torr.

(d) 23.4 g. of α-tert. butylamino-propionic acid-benzylamide dissolved in 50 ml. of absolute tetrahydrofuran are added dropwise during 30 minutes with cooling to a suspension of 9 g. of lithium aluminium hydride in 170 ml. of absolute tetrahydrofuran. The suspension is then refluxed for 39 hours. After cooling, 9 ml. of water, 18 ml. of aqueous sodium hydroxide solution (15%) and 27 ml. of water are consecutively added dropwise thereto. After filtration of the hydroxide, the filtrate is concentrated and the residual oil is distilled under vacuum. 1-benzylamino-2-tert. butylamino-propane, B.P. 74–80°/0.01 torr, is obtained.

(e) 22 g. of 1-benzylamino-2-tert. butylamino-propane are dissolved in 220 ml. of ethanol, and 34 g. of pure 48% hydrobromic acid are added. 5 g. of 5% palladium charcoal are added. Hydrogenation is carried out at room temperature and normal pressure for 45 hours. During the hydrogenation 2 portions of 3 g. each of palladium charcoal are added. When the hydrogenation has ceased, the catalyst is removed by filtration and the filtrate is concentrated to dryness. The oily, crude N-tert. butyl-propylenediamine-dihydrobromide is not purified, but is treated with a solution 12.7 g. of cyanogen bromide in 150 ml. of ether. A solution of 11 g. of sodium carbonate in 50 ml. of water is added dropwise during 15 minutes to the suspension. The oil dissolves with development of carbon dioxide. It is stirred for 15 hours at room temperature. The aqueous phase, containing 1-tert. butyl-2-imino-5-methyl-imidazolidine-hydrobromide is separated and reacted as crude product with the sulphonyl chlorides.

EXAMPLE 102

Analogously to Example 101(a), there is produced:

(a) From 23.6 g. (0.1 mol) of 1-tert. butyl-2-imino-5-methyl-imidazolidine hydrobromide and 21.1 g. (0.1 mol) of p-toluenesulphonyl chloride, 1-p-chlorobenzene-sulphonyl - 2-imino-3-tert. butyl-4-methyl-imidazolidine, M.P. 118–121 (from methylene chloride/ether); and (b) From 23.6 g. (0.1 mol) of 1-tert. butyl-2-imino-5-methylimidazolidine hydrobromide and 21.8 g. (0.1 mol) of N-acetylsulphanilyl chloride, 1-p-acetylaminobenzene-sulphonyl - 2-imino-3-tert. butyl-4-methyl-imidazolidine, M.P. 232–234°. This product is converted to 1-sulphanilyl-2 - imino - 3 - tert. butyl - 4 - methyl - imidazolidine, M.P. 178–180°, in the following manner:

5.5 g. of the acetyl compound are dissolved in 40 ml. of concentrated ethanolic hydrochloric acid, and the solution is allowed to stand for 2½ days at room temperature. It is then concentrated to dryness and the residue is dissolved in water. The solution is rendered alkaline with sodium hydroxide solution and the product which precipitates is separated by filtration and recrystallised from isopropanol.

The following prescriptions illustrate the production of tablets and dragées:

EXAMPLE 103

1000 g. of 1-sulfanilyl-2-imino-3-n-butyl-imidazolidine are mixed with 500 g. of lactose and 270 g. of potato starch. The mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of aerosil (a highly disperse silica) are mixed in and the mixture is pressed into 10,000 tablets each weighing 200 mg. and containing 100 mg. of active substance. If desired the tablets can be grooved for better adaptation of the dosage.

EXAMPLE 104

A granulate is produced from 1,000 g. of 1-sulfanilyl-2-imino-3-n-butyl-imidazolidine, 345 g. of lactose and the aqueous solution of 6.0 g. of gelatine. After drying, the granulate is mixed with 10.0 g. of aerosil, 40.0 g. of talcum, 40.0 g. of potato starch and 5.0 g. of magnesium stearate and pressed into 10,000 dragée cores. These are then coated with a concentrated syrup made from 533 g. of crystallised saccharose, 20.0 g. of shellac, 75.0 g. of gum arabic, 250 g. of talcum, 20 g. of aerosil and 1.5 g. of dyestuff and dried. The dragées obtained each weigh 240 mg. and contain 100 mg. of active substance.

What is claimed is:

1. A compound of the formula:

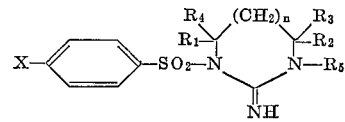

wherein $n$ is 0 or 1;

each of $R_1$ and $R_2$, independently of the other, is hydrogen or lower alkyl;

each of $R_3$ and $R_4$, independently of the other, is hydrogen, lower alkyl, or, if $n$ is 0 form together the tetramethylene radical;

$R_5$ is alkyl of from 1 to 12 carbon atoms, alkoxy of from 3 to 8 carbon atoms, alkylthioalkyl of from 3 to 8 carbon atoms, alkenyl of from 3 to 4 carbon atoms, cycloalkyl of from 3 to 10 carbon atoms, cycloalkenyl of from 5 to 9 carbon atoms, phenethyl or benzyl; and X is hydrogen, fluoro, chloro, bromo, lower alkyl, lower alkoxy, lower alkylthio, acetyl or amino;

or a pharmaceutically acceptable acid addition salt thereof.

2. A compound according to claim 1, wherein $n$ is 0; each of $R_1$ and $R_2$ are hydrogen; each of $R_3$ and $R_4$ independently of the other is hydrogen or lower alkyl, $R_5$ is alkyl of from 1 to 5 carbon atoms or cycloalkyl having at most 5 carbon atoms; and X is amino, chloro, methoxy or acetyl.

3. A compound according to claim 1, wherein $n$ is 0; $R_1$, $R_2$, $R_3$ and $R_4$ are hydrogen; $R_5$ is n-butyl; and X is amino.

4. A compound according to claim 1, wherein $n$ is 0; $R_1$, $R_2$, $R_3$ and $R_4$ are hydrogen; $R_5$ is n-butyl; and X is chloro.

5. A compound according to claim 1, wherein $n$ is 0; $R_1$, $R_2$ and $R_3$ are hydrogen; $R_4$ is ethyl; $R_5$ is n-butyl; and X is amino.

6. A compound according to claim 1, wherein $n$ is 0; $R_1$, $R_2$, $R_3$ and $R_4$ are hydrogen; $R_5$ is i-butyl; and X is amino.

7. A compound according to claim 1, wherein $n$ is 0; $R_1$, $R_2$, $R_3$ and $R_4$ are hydrogen; $R_5$ is i-propyl; and X is amino.

8. A compound according to claim 1, wherein $n$ is 0; $R_1$, $R_2$ $R_3$ and $R_4$ are hydrogen; $R_5$ is t-butyl; and X is amino.

9. A compound according to claim 1, wherein $n$ is 0; $R_1$, $R_2$, $R_3$ and $R_4$ are hydrogen; $R_5$ is cyclopentyl; and X is amino.

10. A compound according to claim 1, wherein $n$ is 0; $R_1$, $R_2$ and $R_3$ are hydrogen; $R_4$ is methyl; $R_5$ is n-butyl; and X is amino.

11. A compound according to claim 1, wherein $n$ is 0; $R_1$, $R_2$ and $R_3$ are hydrogen; $R_4$ is methyl; $R_5$ is sec-butyl; and X is amino.

12. A compound according to claim 1, wherein $n$ is 0; $R_1$, $R_2$ and $R_3$ are hydrogen; $R_4$ is methyl; $R_5$ is t-butyl; and X is amino.

13. A compound according to claim 1, wherein $n$ is 0; $R_1$, $R_2$, $R_3$ and $R_4$ are hydrogen; $R_5$ is n-butyl; and X is methoxy.

14. A compound according to claim 1, wherein $n$ is 0; $R_1$, $R_2$, $R_3$ and $R_4$ are hydrogen; $R_5$ is n-butyl; and X is acetyl.

15. A compound according to claim 1, wherein $n$ is 0; $R_1$, $R_2$ and $R_4$ are hydrogen; $R_3$ is methyl; $R_5$ is t-butyl; and X is amino.

No references cited.

HENRY R. JILES, Primary Examiner

C. M. SHURKO, Assistant Examiner

U.S. Cl. X.R.

260—205, 239.65, 239.75, 239, 256.4, 256.5, 309.6, 309.7, 397.7, 455, 456, 465, 465.5, 470, 471, 543, 545, 556, 561, 570.9; 424—229, 251, 273

US 4-2366/2780/81 CIP

PO-1050
(5/69)

UNITED STATES PATENT OFFICE
CERTIFICATE OF CORRECTION

Patent No. 3,538,085            Dated November 3, 1970

Inventor(s)    Henri Dietrich

It is certified that error appears in the above-identified patent and that said Letters Patent are hereby corrected as shown below:

Col. 7, line 45, "(IX)" should be -- (X) --

Col. 8, line 65, "benzoi" should be -- benzoic --

Col. 10, line 65, "amno" should be -- amino --

Col. 11, line 23, "acetylaminobenbene" should be -- acetylaminobenzene --

Col. 17, line 65, "analogous" should be -- analogously --

Col. 20, line 49, "cyclopenylamino" should be -- cyclopentylamino --

Col. 27, line 27, there should be an open parenthesis [(] after "4'-" and before "aziridin-"

Col. 28, line 1, "2-yl-" should be -- 1-yl- --

Col. 29, line 44, "N-benzyl-" should be -- N'-benzyl --

Col. 29, line 68, "2-butyl-" should be -- 3-butyl- --

Col. 30, line 7, "benzenylamino" should be -- benzylamino --

Col. 30, line 27, "N-benzyl" should be -- N'-benzyl --

Col. 30, line 55, "23.8 g" should be -- 11.8 g --

Col. 30, line 61, "3-ethoxy" should be -- 3-methoxy --

Col. 32, line 19, "ethyl" should be -- ether --

Col. 33, line 2 - "20-30" should be -- 20-30° --

Col. 35, line 14, "cycloxylamino" should be -- cyclohexylamino --

Col. 43, line 26, "110-120" should be -- 119-120 --

Signed and sealed this 2nd day of March 1971.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,538,085      Dated November 3, 1970

Inventor(s) Henri Dietrich

It is certified that error appears in the above-identified patent and that said Letters Patent are hereby corrected as shown below:

Column 44, line 48 (claim 1), after "alkoxy" and before "of" insert -- alkyl --. Column 46, after line 8, insert -- 16. A compound according to claim 1 wherein $\underline{n}$ is 0, each of $R_1$, $R_2$ and $R_3$ is hydrogen, $R_4$ is meth$\overline{y}$l, $R_5$ is cyclohexyl: and X is amino --. In the heading to the printed specification, line 13, "15 Claims" should read -- 16 Claims --.

Signed and sealed this 16th day of November 1971.

(SEAL)
Attest:

EDWARD M. FLETCHER, JR.      ROBERT GOTTSCHALK
Attesting Officer      Acting Commissioner of Patents